US005624763A

United States Patent [19]
Melancon et al.

[11] Patent Number: 5,624,763
[45] Date of Patent: Apr. 29, 1997

[54] SILICONE/ACRYLATE VIBRATION DAMPERS

[75] Inventors: Kurt C. Melancon, St. Paul; William A. Driscoll, Woodbury, both of Minn.

[73] Assignee: Minnesota Mining and Manufacturing Company, St. Paul, Minn.

[21] Appl. No.: 461,044

[22] Filed: Jun. 5, 1995

Related U.S. Application Data

[62] Division of Ser. No. 121,031, Sep. 13, 1993, Pat. No. 5,464,659, which is a continuation of Ser. No. 887,298, May 22, 1992, abandoned, which is a continuation-in-part of Ser. No. 704,380, May 23, 1991, Pat. No. 5,308,887.

[51] Int. Cl.$^6$ .............................. B32B 15/08; B32B 7/12
[52] U.S. Cl. ...................... 428/461; 428/344; 428/345; 428/447; 522/6
[58] Field of Search ..................... 428/230, 261, 428/461, 447, 344

[56] References Cited

U.S. PATENT DOCUMENTS

| | | | |
|---|---|---|---|
| Re. 24,901 | 12/1960 | Abbott | 22/40 |
| Re. 24,906 | 12/1960 | Ulrich | 206/59 |
| 2,736,721 | 2/1956 | Dexter | 260/42 |
| 2,814,601 | 11/1957 | Currie et al. | 260/29.1 |
| 2,857,356 | 10/1958 | Goodwin, Jr. | 260/42 |
| 3,121,021 | 2/1964 | Copeland | 117/122 |
| 3,527,842 | 9/1970 | Clark | 260/825 |
| 3,528,940 | 9/1970 | Modic | 260/37 |
| 3,577,264 | 5/1971 | Nordstrom | 117/93.31 |
| 3,623,942 | 11/1971 | Yerrick | 428/447 |
| 3,640,836 | 2/1972 | Oberst et al. | 161/165 |
| 3,658,635 | 4/1972 | Eustice | 428/461 |
| 3,676,192 | 7/1972 | Hahn | 117/93.31 |
| 3,801,535 | 4/1974 | Joschiko | 260/29.1 |
| 3,847,726 | 11/1974 | Becker et al. | 161/186 |
| 3,878,263 | 4/1975 | Martin | 260/825 |
| 3,887,669 | 6/1975 | Pillet | 264/16 |
| 3,928,499 | 12/1975 | Tomalia et al. | 260/885 |
| 3,941,640 | 3/1976 | Farnam et al. | 156/252 |
| 3,983,298 | 9/1976 | Hahn et al. | 428/355 |
| 4,048,366 | 9/1977 | Kingsbury | 428/215 |
| 4,070,526 | 1/1978 | Colquhoun et al. | 428/327 |
| 4,098,951 | 7/1978 | Wolff | 428/461 |
| 4,100,318 | 7/1978 | McCann et al. | 428/159 |
| 4,117,028 | 9/1978 | Hahn | 260/825 |
| 4,130,708 | 12/1978 | Friedlander et al. | 528/28 |
| 4,136,250 | 1/1979 | Mueller et al. | 528/29 |
| 4,153,641 | 5/1979 | Deichert et al. | 260/827 |
| 4,158,617 | 6/1979 | Eldred | 204/159.13 |
| 4,181,752 | 1/1980 | Martens et al. | 427/54.1 |
| 4,201,808 | 5/1980 | Cully et al. | 428/40 |
| 4,223,067 | 9/1980 | Levens | 428/308 |
| 4,223,073 | 9/1980 | Caldwell et al. | 428/422 |
| 4,276,402 | 6/1981 | Chromecek et al. | 526/264 |
| 4,293,397 | 10/1981 | Sato et al. | 204/159.13 |
| 4,303,485 | 12/1981 | Levens | 204/159.24 |
| 4,304,705 | 12/1981 | Heilmann et al. | 260/30.4 |
| 4,309,520 | 1/1982 | Blizzard | 525/477 |

(List continued on next page.)

FOREIGN PATENT DOCUMENTS

| | | | |
|---|---|---|---|
| 575664 | 5/1959 | Canada . | |
| 1218954 | 3/1987 | Canada | 204/91.59 |
| 58909 | 9/1982 | European Pat. Off. | C08J 3/28 |
| 0152179 | 8/1985 | European Pat. Off. | C08L 83/07 |
| 159683 | 10/1985 | European Pat. Off. | C09D 3/22 |
| 0170219 | 2/1986 | European Pat. Off. | A61C 9/00 |
| 0176481 | 4/1986 | European Pat. Off. | C08G 77/20 |
| 0250248 | 12/1987 | European Pat. Off. | C08G 77/54 |

(List continued on next page.)

OTHER PUBLICATIONS

"Constrained Layer Viscoelastic Vibration Damping" published by Society of Manufacturing Engineers, MI, 1989.
"The Handbook of Pressure–Sensitive Adhesive Technology", (Satas, 1982) pp. 346, 348.
Test Method No. 1 (PSTC–1), Pressure Sensitive Tape Counsil, Glenview, IL., 7th Ed. (1976).
Silicone Pressure Sensitive Adhesives for High Performance Applications, Thomas J. Tangney, Dow Corning Corporation, Midland, MI, Sep. 1986.
Formulating Silicon Pressure Adhesives for Application Performance, Loretta A. Sobieski, Dow Corning Corporation, Midland, MI, May 1986.
Dow Corning Pressure Sensitive Adhesives, Product Information, Q2–7406 Adhesives.
Dow Corning Silicone Pressure Sensitive Adhesives, Application Information, Q2–7470 and Q2–7407 Adhesives.
Silicones, *Enc. of Polym. Sci. & Eng.*, 2nd Ed. vol. 15, pp. 296–297.
Silicone Pressure Sensitive Adhesives by Duane F. Merrill, Proceedings, Adhesive Coating Technology pp. 197–200, Jun., 1980.
Constrained Layer Viscoelastic Vibration Damping by Michael L. Parin, SME Technical Paper, AD89–551 pp. 1–19 (Sep., 1989).
The Thermal, Dynamic Mechanical and Morphological Properties of Silicone Adhesives, a Thesis submitted to the faculty of the Graduate School of the University of Minnesota by Bruce Campbell Copley, Mar., 1984.
Silicones, *Enc. of Polym. Sci. & Eng.*, 1st Ed. pp. 541, 544–552.
Bull. Chem. Soc. Japan 41(10), 1968, pp. 2521–2523.
Properties of Ultraviolet Cured Polydimethylsiloxane–Urea Acrylates, X. Yu, S.L. Cooper, et al., *J. Appl. Poly. Sci.*, 30, 2115 (1985).
Adhesive Age, Mar. 1979, pp. 39–41.
Adhesive Coatings Technology–Tech Seminar, Jun. 1980.

*Primary Examiner*—Tae Yoon
*Attorney, Agent, or Firm*—Gary L. Griswold; Walter N. Kirn; Steven E. Skolnick

[57] ABSTRACT

A method of vibrationally damping article, comprising applying to the article a vibration damper comprising a radiation curable vibration damping material which comprises (a) from about 5 parts to about 95 parts by weight acrylic monomer and (b) correspondingly, from about 95 parts to about 5 parts by weight of a silicone adhesive, wherein the sum of (a) plus (b) equal 100 parts by weight, whereby the vibration damper vibrationally damps the article.

14 Claims, 15 Drawing Sheets

U.S. PATENT DOCUMENTS

| | | | |
|---|---|---|---|
| 4,329,384 | 5/1982 | Vesley et al. | 428/40 |
| 4,330,590 | 5/1982 | Vesley | 428/336 |
| 4,339,339 | 7/1982 | Maciejewski | 525/477 |
| 4,348,454 | 9/1982 | Eckberg | 428/334 |
| 4,364,972 | 12/1982 | Moon | 427/54.1 |
| 4,369,300 | 1/1983 | Carter et al. | 528/28 |
| 4,370,358 | 1/1983 | Hayes et al. | 427/54.1 |
| 4,379,201 | 4/1983 | Heilmann et al. | 428/345 |
| 4,391,687 | 7/1983 | Velsey | 204/159.16 |
| 4,415,615 | 11/1983 | Esmay et al. | 428/40 |
| 4,447,493 | 5/1984 | Driscoll et al. | 428/332 |
| 4,461,796 | 7/1984 | Fukahori et al. | 428/116 |
| 4,477,326 | 10/1984 | Lin | 204/159.13 |
| 4,477,548 | 10/1984 | Harasta et al. | 430/14 |
| 4,503,208 | 3/1985 | Lin et al. | 528/15 |
| 4,504,629 | 3/1985 | Lien et al. | 525/288 |
| 4,518,794 | 5/1985 | Boutevin et al. | 560/192 |
| 4,528,081 | 7/1985 | Lien et al. | 204/159.13 |
| 4,554,339 | 11/1985 | Hockemeyer et al. | 528/26 |
| 4,558,111 | 12/1985 | Tolentino | 528/26 |
| 4,561,950 | 12/1985 | Leo | 522/91 |
| 4,563,539 | 1/1986 | Gornowicz et al. | 556/421 |
| 4,568,566 | 2/1986 | Tolentino | 427/54.1 |
| 4,575,545 | 3/1986 | Nakos et al. | 526/242 |
| 4,575,546 | 3/1986 | Klemarczyk et al. | 526/245 |
| 4,584,355 | 4/1986 | Blizzard et al. | 525/477 |
| 4,584,394 | 4/1986 | Hansel et al. | 556/442 |
| 4,585,836 | 4/1986 | Homan et al. | 525/477 |
| 4,587,276 | 5/1986 | Lien et al. | 522/34 |
| 4,587,313 | 5/1986 | Ohta et al. | 526/75 |
| 4,591,622 | 5/1986 | Blizzard et al. | 525/477 |
| 4,595,471 | 6/1986 | Preiner et al. | 522/29 |
| 4,597,987 | 7/1986 | Hockemeyer et al. | 427/54.1 |
| 4,603,086 | 7/1986 | Fujii et al. | 428/447 |
| 4,608,270 | 8/1986 | Varaprath | 427/35 |
| 4,675,346 | 6/1987 | Lin et al. | 522/39 |
| 4,678,846 | 7/1987 | Weitemeyer et al. | 525/477 |
| 4,693,776 | 9/1987 | Krampe et al. | 156/327 |
| 4,698,406 | 10/1987 | Lo et al. | 528/12 |
| 4,726,982 | 2/1988 | Trayner et al. | 428/213 |
| 4,741,966 | 5/1988 | Cavezzin | 428/447 |
| 4,742,103 | 5/1988 | Morita et al. | 524/174 |
| 4,748,043 | 5/1988 | Seaver et al. | 427/30 |
| 4,774,297 | 9/1988 | Murakami et al. | 525/478 |
| 4,777,276 | 10/1988 | Rasmussen et al. | 556/419 |
| 4,791,163 | 12/1988 | Traver et al. | 524/506 |
| 4,831,070 | 5/1989 | McInally et al. | 524/267 |
| 4,831,080 | 5/1989 | Blizzard et al. | 525/108 |
| 4,839,206 | 6/1989 | Waldenberger | 428/40 |
| 4,889,753 | 12/1989 | Brown et al. | 428/40 |
| 4,894,259 | 1/1990 | Kuller | 427/208.8 |
| 4,895,738 | 1/1990 | Zimmerman et al. | 427/208.8 |
| 4,898,920 | 2/1990 | Lee et al. | 525/477 |
| 4,906,695 | 3/1990 | Blizzard et al. | 525/100 |
| 4,917,929 | 4/1990 | Heinecke | 428/41 |
| 4,925,671 | 5/1990 | Abber | 424/448 |
| 4,942,187 | 7/1990 | Kawata et al. | 523/200 |
| 4,943,613 | 7/1990 | Arai et al. | 524/773 |
| 4,943,620 | 7/1990 | Gomyo et al. | 525/474 |
| 4,988,743 | 1/1991 | Eckberg | 522/99 |
| 5,008,324 | 4/1991 | Killgoar, Jr. et al. | 524/504 |
| 5,066,708 | 11/1991 | Koller, Sr. et al. | 524/504 |
| 5,070,118 | 12/1991 | Eckberg | 522/99 |
| 5,085,364 | 2/1992 | Ishikawa et al. | 228/139 |
| 5,091,440 | 2/1992 | Griswold | 522/99 |
| 5,118,723 | 6/1992 | Irifune et al. | 522/99 |
| 5,237,082 | 8/1993 | Leir et al. | 556/413 |
| 5,264,278 | 11/1993 | Mazurek et al. | 525/479 |
| 5,306,758 | 4/1994 | Pellerite | 524/366 |

FOREIGN PATENT DOCUMENTS

| | | | |
|---|---|---|---|
| 0289928 | 4/1988 | European Pat. Off. | C09J 3/14 |
| 0311262 | 9/1988 | European Pat. Off. | C08L 83/08 |
| 0308216 | 3/1989 | European Pat. Off. | C09J 7/02 |
| 0332400 | 8/1989 | European Pat. Off. | C08L 83/14 |
| 0355991 | 2/1990 | European Pat. Off. | C09J 183/07 |
| 0363071 | 4/1990 | European Pat. Off. | C08L 83/08 |
| 0378420 | 7/1990 | European Pat. Off. | C08L 83/08 |
| 0393426 | 10/1990 | European Pat. Off. | C09J 183/07 |
| 0390207 | 10/1990 | European Pat. Off. | C08F 259/08 |
| 0421643 | 4/1991 | European Pat. Off. | C08L 83/08 |
| 2507196 | 12/1982 | France | C09J 7/02 |
| 2596676 | 10/1987 | France | B05D 5/10 |
| 1918196 | 10/1970 | Germany | F16F 7/00 |
| 56-43352 | 4/1981 | Japan | C08F 2/50 |
| 60-26065 | of 1985 | Japan | C09D 3/82 |
| 60-104158 | 6/1985 | Japan | C08L 83/07 |
| 60-115025 | 6/1985 | Japan | G11B 5/72 |
| 60-190427 | 9/1985 | Japan | C07F 7/18 |
| 60-197780 | 10/1985 | Japan | G09J 3/14 |
| 61-57355 | of 1986 | Japan | B14J 3/20 |
| 62-295982 | of 1987 | Japan | C09J 7/02 |
| 62-4771 | of 1987 | Japan | C09J 7/02 |
| 63-291971 | of 1988 | Japan | C09J 3/14 |
| 63291969 | 11/1988 | Japan | C09J 3/12 |
| 1-245078 | 9/1989 | Japan | C09J 7/02 |
| 1-245079 | 9/1989 | Japan | C09J 7/02 |
| 2-36234 | of 1990 | Japan | C08G 77/04 |
| 2-1785 | of 1990 | Japan | C09J 133/06 |
| 2-58587 | 2/1990 | Japan | C08L 83/05 |
| 02274783 | 11/1990 | Japan | C09J 7/02 |
| 3-181509 | of 1991 | Japan . | |
| 3-170579 | of 1991 | Japan | C09J 175/04 |
| 3-89037 | of 1991 | Japan | F16F 1/40 |
| 04021439 | 1/1992 | Japan | B32B 15/08 |
| 4018344 | 1/1992 | Japan | B29C 65/48 |
| 998232 | 8/1963 | United Kingdom | C08G 5/10 |
| 1323869 | 7/1973 | United Kingdom | C08G 47/02 |
| 2039287 | 1/1979 | United Kingdom | C08G 77/04 |
| 2018805 | 10/1979 | United Kingdom . | |
| 2109390 | 10/1981 | United Kingdom | C08G 77/26 |
| WO881020 | 2/1988 | WIPO | F03H 1/00 |
| WO90/10028 | 9/1990 | WIPO | C08G 77/20 |

SILICONE/ACRYLATE VIBRATION DAMPERS

CROSS-REFERENCE TO RELATED APPLICATIONS

This is a division of application Ser. No. 08/121,031, filed Sep. 13, 1993, now U.S. Pat. No. 5,464,659, which is a continuation of application Ser. No. 07/887,298, filed May 22, 1992, now abandoned, which is a continuation-in-part of application Ser. No. 07/704,380, filed May 23, 1991, now U.S. Pat. No. 5,308,887.

BACKGROUND OF THE INVENTION

1. Field of the Invention

This invention relates to silicone/acrylate vibration dampers.

2. Description of the Related Art

Damping is the dissipation of mechanical energy as heat by a material in contact with the source of that energy. It is desirable that the damping occur over a wide range of temperatures (e.g. −50° C. to 200° C.) and a broad frequency range from as low as about 0.1 to 5 Hertz (Hz), the frequency range over which tall buildings experience wind sway or seismic vibrations, to higher frequencies such as 1 kilohertz (KHz) experienced by computer disk drives, to even higher frequencies of 5 to 10 KHz experienced in high cycle fatigue applications.

For damping applications, it is further desirable that the damping material, sometimes referred to as viscoelastic material, have the following properties: (1) damping capabilities at high temperatures e.g., at 50° C. and above, preferably 100° C. and above; and (2) damping performance that is substantially independent of temperature over the useful temperature range.

In terms of measured characteristics, the composition should ideally have a high loss factor (tan δ) and a modulus (G′, G″) that is independent of temperature. In some applications, it may be desirable for the damping material to possess adhesive properties.

Until now, industry has sacrificed bond strength and broad temperature coverage for the ability to provide damping performance at elevated temperatures. Applications where damping is required over a broad temperature range include aircraft skins, airplane engine stationary inlet guide vanes, and satellite components.

U.S. Pat. No. 4,942,187 (Kawata et al.) discloses a vibration-damping rubber composition comprising: (A) 100 parts by weight hexene-1 type polymer and a Si-containing graft copolymer; (B) 5–50 parts by weight inorganic reinforcing agent; (C) 0–50 parts by weight processing oil; and (D) 0.1–5 parts by weight crosslinking agent. Although "vibration insulating" properties and resistance to permanent compression set are disclosed, the compositions show losses of from 69–85% of the 100% modulus value when heat aged at 175° C. for 72 hours, and a loss factor of less than 0.5 at 50° C. and 100 Hz.

European Patent Publication No. 0,390,207 (Yagi et al.) discloses a vibration proof damping material prepared from a blend of (a) amorphous fluorine-containing polymer or a crystalline vinylidene fluoride containing polymer and (b) acrylic polymer. The material is stated to provide vibration damping for noise sources and stability in shape over a wide temperature range.

U.S. Pat. No. 5,085,364 (Ishikawa et al.) discloses a pressure sensitive adhesive composition for temporarily securing surface-mount devices on circuit boards. The composition comprises a suitable resinous material having a dynamic modulus of $10^4$ to $10^9$ dynes/cm$^2$ at 200° C.–280° C. at a frequency of 10 Hz. Examples of resinous materials include acrylate copolymers, silicone rubbers, silicone-acrylate copolymers, diene rubbers, vinyl ether resins, vinyl pyrrolidone-based resins, polysaccharides, amylopectin, and plant gums. Dynamic mechanical properties are reported at 260° C. and a frequency of 10 Hz.

Thus a need exists for vibration damping materials having bond strength, elevated temperature damping performance and damping over a broad temperature range of about −50° C. to about 200° C. While silicone adhesives and acrylates are known as vibration damping materials, the present invention suprisingly discloses that compositions based on silicone/acrylate blends provide a synergistic performance and are especially useful for vibration damping. The compositions having a storage modulus, G′, above the rubbery plateau, e.g., above about 0.01 megapascals (MPa) at 3 Hz and a loss tangent, tan δ, above 0.5, preferably above 0.7 over significant portions of the temperature range of about −50° C. to about 200° C. at a frequency of 3 Hz.

SUMMARY OF THE INVENTION

The present invention relates to a method of vibrationally damping an article by applying to the article a vibration damper comprising a radiation curable vibration damping material. The vibration damping material comprises (a) from about 5 parts to about 95 parts by weight acrylic monomer and (b) correspondingly, from about 95 parts to about 5 parts by weight of a silicone adhesive, wherein the sum of (a) plus (b) equal 100 parts by weight. More preferably, the vibration damping materials comprise:

(a) from about 5 parts to about 95 parts acrylic monomer wherein the acrylic monomer comprises:
  (i) from about 5 to about 100 parts of alkyl acrylate monomer, the alkyl groups of which have an average of 4 to 14 carbon atoms; and
  (ii) correspondingly from about 95 parts to about 0 parts of monoethylenically unsaturated copolymerizable modifier monomer;
  wherein the amounts of (i) and (ii) are selected such that the total amount of (i) plus (ii) equals 100 parts by weight of the acrylic monomer; and (b) correspondingly from about 95 parts to about 5 parts of a silicone adhesive wherein the amounts of (a) and (b) are selected such that the total amount of (a) plus (b) equals 100 parts by weight;

(c) about 0 part to about 5 parts by weight of photoinitiator based upon 100 parts by weight of the acrylic monomer; and (d) about 0 to about 5 parts by weight of a crosslinker based upon 100 parts by weight of (a) plus (b). Preferably, the vibration damping material consists essentially of acrylic monomer, silicone adhesives, optional photoinitiator (preferably about 0.01 to about 5 parts) and optional crosslinker.

The silicone adhesive of the vibration damping material preferably comprises the intercondensation product of a silanol functional polydiorganosiloxane and a silanol functional copolymeric silicone resin. The vibration damping material of the invention is a solventless system (i.e., containing preferably no organic or inorganic solvents, at most less than about 1 weight percent of solvent based upon the total weight of the vibration damping material).

The invention also provides pressure-sensitive adhesive tapes comprising the vibration damping material of the invention coated on a backing or substrate, or as a transfer tape.

BRIEF DESCRIPTION OF THE DRAWINGS

The invention will be more fully appreciated with reference to the following drawings in which.

DETAILED DESCRIPTION OF THE PREFERRED EMBODIMENTS

Figure 1:
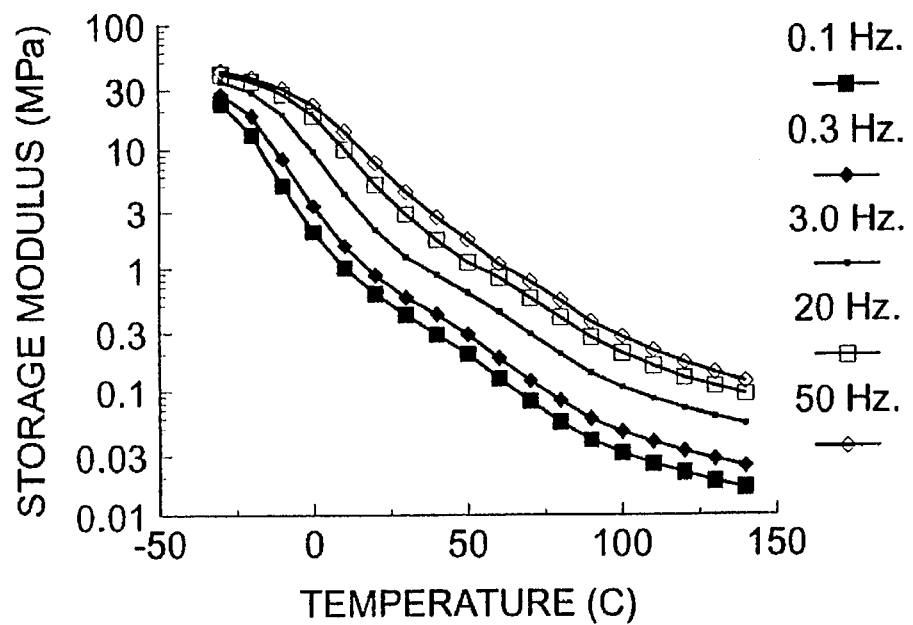
FIG. 1 is a graphical representation of storage modulus versus temperature for the vibration damping material of example 1 at several frequencies.

The present invention relates to an ultraviolet radiation polymerizable vibration damping material comprising from about 5 to about 95 parts by weight of an acrylic monomer and correspondingly from about 95 to about 5 parts by weight of a silicone adhesive. More preferably, the vibration damping material comprises about 30 to about 95 parts acrylic monomer and, correspondingly, from about 70 to about 5 parts silicone adhesives.

By "acrylic monomer" are meant acrylic monomer(s), acrylic comonomers, mixtures of more than one monomer, mixtures of comonomers, and mixtures of monomers and comonomers.

The vibration damping material of the invention may have pressure sensitive adhesive properties, providing good tack and good peel adhesion. Such vibration damping materials adhere well to a variety of surfaces over a broad temperature range and, therefore, have wide utility.

Vibration damping performance may be characterized by the following dynamic properties of the viscoelastic material: complex modulus (G'), storage modulus (G'), loss modulus (G"), and loss factor (tan δ). Knowing any two of these properties allows the other two to be mathematically determined as follows:

$$\tan\delta = G''/G'$$

$$G^* = G' + G'' = G'(1 + i\tan\delta)$$

$$G^{*2} = G'^2 + G''^2$$

-continued $$G' = G^* \cos\delta$$

$$G'' = G^* \sin\delta$$

where $i = \sqrt{-1}$

The storage modulus represents that portion of the mechanical energy which is stored (i.e., completely recoverable) when the viscoelastic material undergoes cyclic deformation. The stored energy is analogous to that seen in a simple spring going through cyclic deformation.

The loss modulus represents that portion of the mechanical energy dissipated (converted to heat) when the viscoelastic material undergoes cyclic deformation. The dissipated energy is analogous to that seen in a simple dashpot going through cyclic deformation. This ability to dissipate energy gives rise to amplitude (and resultant stress) attenuation in resonance vibrations of structures when viscoelastic materials (either constrained layer or free layer) are used in surface layer damping devices.

While the performance of a surface layer damping treatment depends largely on the dynamic properties of the viscoelastic material, it is also dependent on other parameters. The geometry, stiffness, mass and mode shape of the combination of the damper and the structure to which it is applied will affect the performance of the damper.

Since modern computer technology lends itself to the manipulation of complex numbers, damping treatment designers utilize the dynamic properties in the form of complex numbers (e.g. G'[1 +i tan δ]) to predict the performance of a damping treatment on a structure, for both exact solutions to simple structures (beams or plates) or numerical solutions (Finite Element Analysis) to more complex structures. Therefore, the properties of viscoelastic materials typically reported by manufacturers are G' and tan δ.

The dynamic properties of a viscoelastic material are temperature and frequency dependent. Optimum damping occurs when the viscoelastic material is going through a modulus transition (from a glassy state to a rubbery state) and tan δ goes through a maximum (typically about 1.0). In general, for most polymer systems, this transition occurs over a fairly narrow temperature range (30° to 40° C. range). Previous attempts to broaden the temperature range of the modulus transition of a viscoelastic material resulted in large penalties in the loss factor which resulted in decreased damping capacity.

Since vibration problems are subject to both temperature and frequency variations, it is important that variation of the dynamic properties of a viscoelastic material with temperature and frequency be taken into account, both when selecting the appropriate viscoelastic material as well as designing the construction of the damping treatment.

In addition, it is often desirable to have a single damping treatment perform over widely varying temperatures such as for aircraft which may operate in both arctic and desert climates. Furthermore, it is often desirable to have a damping treatment perform at a number of frequencies such as when two or more vibration modes are being excited in a single system.

Since presently known single component viscoelastic materials perform over fairly narrow temperature ranges, conventional solutions to wide temperature variations incorporate multiple layers of viscoelastic material, with each layer being optimized for a different temperature range.

These multilayer systems are expensive and complex. Consequently, it would be highly desirable to have a single viscoelastic material that performs over a broad temperature range.

The vibration damping materials of the invention may be utilized as a vibration damping material alone (i.e., free layer treatment) or in conjunction with a stiff layer (i.e., as part of a constrained-layer treatment). Preferably, compositions are used in constrained-layer constructions with a laminate of one or more stiff layers and one or more layers of the composition to damp vibrations.

Vibration damping materials are most efficiently used if they are sandwiched between the structure/device to be damped and a relatively stiff layer, such as thin sheet metal. This forces the viscoelastic material to be deformed in shear as the panel vibrates, dissipating substantially more energy than when the material deforms in extension and compression, as occurs in free layer treatment.

Constrained-layer constructions can be prepared by two processes. In the first process, a layer of the unpolymerized vibration damping material is coated onto a release liner, the material polymerized, and the layer of resulting viscoelastic material transferred to a stiff backing and adhered thereto, thereby providing a constrained-layer construction. In the second process, a layer of unpolymerized material is coated directly onto a backing and the mixture polymerized "in-situ" to provide the constrained-layer construction. In each case, the constrained-layer construction is then affixed to the structure requiring damping. The construction may be attached in any manner provided that the constraining layer is only fixed to the vibrating structure via the viscoelastic material interface, i.e. free of mechanical attachment. When the structure subsequently vibrates under the influence of an internally or externally applied force, the vibration is damped.

When the vibration damping material has pressure sensitive adhesive properties, the material can usually be adhered to a stiff constraining layer without the use of an additional bonding agent. However, it is sometimes necessary, to use a thin layer (e.g., 20–50 μm) of a high-modulus adhesive, such as an acrylic adhesive or an epoxy adhesive, to bond the composition to a structure.

For most applications, the layer of viscoelastic material has a thickness of at least 0.01 mm up to about 100 mm, more preferably 0.05 to 100 mm. The viscoelastic material can be applied by any of the techniques known in the art such as by spraying, dipping, knife, or curtain coating, or molding, laminated, or casting.

As mentioned above, a stiff layer is an essential part of constrained-layer vibration-damping constructions of the invention. A suitable material for a stiff layer has a stiffness of at least 0.40 (relative to stainless steel) as defined in "Handbook of Tables for Applied Engineering Science" ed. Bolz, R. E. et al., CRC Press, Cleveland, Ohio, page 130 (1974). The desired stiffness of the stiff layer is varied by adjusting the thickness of the layer, for example from about 25 micrometers to 5 centimeters, depending on the modulus of the stiff layer. Examples of suitable materials include metals such as iron, steel, nickel, aluminum, chromium, cobalt, and copper, and alloys thereof and stiff polymeric materials such as polystyrene; polyester; polyvinylchloride; polyurethane; polycarbonate; polyimide; and polyepoxide; fiber-reinforced plastics such as glass fiber, ceramic fiber, and metal fiber-reinforced polyester; glasses; and ceramics.

The acrylic monomers useful in the invention comprise from about 5 to about 100 parts alkyl acrylate monomer and, correspondingly, from about 95 to about 0 parts of monoethylenically unsaturated copolymerizable modifier monomer for a good balance of damping properties. More preferably, the acrylic monomer comprises from about 5 to 99 parts alkyl acrylate monomer and, correspondingly, from about 95 parts to 1 part modifier monomer.

The amounts of modifier monomer and alkyl acrylate are typically selected for the damping performance needs of a specific application. In general, higher amounts of modifier monomer contribute to elevated temperature damping properties. At low modifier monomer concentrations, the vibration damping materials are typically soft and pliable and provide damping properties at lower temperatures.

The alkyl acrylate monomers useful in the vibration damping materials of the present invention are preferably monofunctional unsaturated acrylate esters of non-tertiary alkyl alcohols, the molecules of which have from about 4 to about 14 carbon atoms. Such monomers include those selected from the group consisting of isooctyl acrylate, 2-ethyl hexyl acrylate, isononyl acrylate, decyl acrylate, dodecyl acrylate, butyl acrylate, hexyl acrylate, mixtures thereof, and the like. Preferred alkyl acrylate monomers comprise isooctyl acrylate, 2-ethylhexyl acrylate, isononyl acrylate, butyl acrylate, and mixtures thereof. The alkyl acrylate monomers can be copolymerized with at least one copolymerizable modifier monomer.

The term "monoethylenically unsaturated copolymerizable modifier monomer", also referred to herein as the "modifier monomer" refers to a monomer that is capable of increasing the Tg (glass transition temperature) of a copolymer formed from the acrylic monomers, i.e., the alkyl acrylate and the modifier monomer, so that the Tg of the copolymer would be higher than that of a homopolymer of the alkyl acrylate. The modifier monomer is selected from monoethylenically unsaturated copolymerizable monomers wherein the homopolymer of the modifier monomer has a higher Tg than the homopolymer of the alkyl acrylate. For example, the Tg of a homopolymer of 2-ethylhexyl acrylate is −50° C. Examples of suitable comonomers are acrylic acid (homopolymer Tg of 106° C.) and isobornyl acrylate (homopolymer Tg of 94° C.). The modifier monomer can comprise polar monomers, non-polar monomers, or mixtures thereof. Useful polar monomers include acrylamides, substituted acrylamides, acrylic acid, N-vinyl caprolactam, hydroxyalkyl acrylates such as 2-hydroxy ethyl acrylate; N-vinylpyrrolidone, N,N-dimethylacrylamide, acrylonitrile, methacrylic acid, itaconic acid, mixtures thereof, and the like.

Preferred, polar monomers comprise acrylic acid acrylamide, N-vinyl-2-pyrrolidone, N-vinyl caprolactam, 2-hydroxyethylacrylate, and mixtures thereof for reasons of providing good adhesion properties including good adhesion build. Non-polar monomers that are useful, include cyclohexyl acrylate, trimethylcyclohexyl acrylate, dicyclohexadienyl acrylate, isobornyl acrylate, methylacrylate, ethyl acrylate, derivatives thereof, mixtures thereof, and the like.

The amount of modifier monomer that is useful depends upon the particular modifier monomer, alkyl acrylate, and silicone adhesive in the composition. The components of the vibration damping material i.e., the modifier monomer, the alkyl acrylate monomer, and the silicone adhesive, are selected such that when the silicone adhesive has been dispersed into the monomers to form a homogenous mixture, the components will not exhibit phase separation when left at room temperature, i.e., about 23° C. over a period of 12 hours, as visible to the naked eye. Phase separation, which is believed to be caused by incompatibility of the components, can appear as a distinct layer wherein the monomers exist as layers or as a small pool in the silicone adhesive, depending upon the concentration and particular type of modifier monomer, alkyl acrylate, and silicone adhesive in the vibration damping material. Phase separation can also be noted as extreme clouding of the damping material wherein the silicone adhesive could appear as curd-like particles in the monomer. There are variations of the phenomena described above as phase separation, but one skilled in the art would readily recognize phase separation by visual inspection.

Silicone adhesives employed in the vibration damping material of the invention, are well known in the art. Silicone adhesives are, in general terms, blends of (i) polydiorganosiloxanes (also referred to as "silicone gums" typically having a number average molecular weight of about 5000 to about 10,000,000 preferably about 50,000 to about 1,000,000) with (ii) copolymeric silicone resins (also referred to as "MQ resins" typically having a number average molecular weight of about 100 to about 1,000,000, preferably about 500 to about 50,000 number average molecular weight) comprising triorganosiloxy units and $SiO_{4/2}$ units. Preferably the silicone adhesives comprise from about 20 to about 60 parts by weight silicone gum and, correspondingly, from about 40 to about 80 parts by weight MQ resins. It is beneficial, in terms of improving adhesive properties, to provide a chemical means of reacting the copolymeric silicone resin with the polydiorganosiloxane. To achieve such a reaction, two different reaction chemistries have been commonly used; condensation chemistry and addition-cure chemistry.

Silicone adhesives based on condensation chemistry can be prepared by admixing silanol functional copolymeric resins comprising triorganosiloxy units and $SiO_{4/2}$ units with silanol-endblocked polydiorganosiloxanes as shown in U.S. Pat. Nos. 2,736,721; 2,814,601; 4,309,520; 2,857,356; 3,528,940; and Great Britain Patent No. 998,232. Such blends, which are usually a solvent solution of copolymeric silicone resin and polydiorganosiloxane, as used in the art, are generally applied to a backing, heated to remove solvent, and crosslinked, if necessary, to improve the physical properties of the adhesive.

It is taught in these references that improvements in adhesive properties are realized when the copolymeric silicone resin and the polydiorganosiloxane are intercondensed, providing intra- and inter-condensation within the adhesive. According to these references the condensation between the copolymeric silicone resin and the polydiorganosiloxane can be effected either in the presence of a catalyst at ambient or elevated temperature, or in the absence of a catalyst at elevated temperatures, as well as prior to application of the adhesive to a backing, or subsequent to application of the adhesive to a backing. Effective catalysts for promoting the silanol condensation reaction include organometallic compounds and metal salts of carboxylic acids as taught in U.S. Pat. No. 2,736,721, and amines as taught in Canadian Patent No. 575,664. An additional method of intercondensing silicone resins and polydiorganosiloxanes is through the addition of orthosilicates, as taught in U.S. Pat. No. 4,831,070, and polysilicates.

A silicone adhesive comprising the intercondensation product of a silanol functional polydiorganosiloxane and a silanol functional copolymeric silicone resin, as discussed above, can optionally include a free radical polymerization catalyst, such as a diaryl peroxide crosslinker, to crosslink the adhesive composition, thereby improving the high temperature shear properties of the adhesive with only a slight loss in peel adhesion as taught in *The Handbook of Pressure-Sensitive Adhesive Technology*, (Satas, 1982), p. 348. When a peroxide crosslinker is present in the solution of silicone adhesive, the adhesive is generally applied to a backing, heated moderately to volatilize the solvent, and the dried adhesive heated further to temperatures in the range of 150° C. to about 250° C. to activate the crosslinker as show in U.S. Pat. No. 4,039,707. In applications where adhesive performance at elevated temperature is not required, the crosslinking agent may be omitted.

The polydiorganosiloxanes used in the preparation of the silicone adhesive component of the instant invention can include any of the common structures and accompanying functionalities known in the art, including polydimethylsiloxane polymers and poly(dimethylsiloxane/diphenylsiloxane) copolymers.

The copolymeric silicone resins useful in the preparation of the silicone adhesive component of the present invention include any of the common structures recited in the above references which include copolymeric silicone resins having one or more of the following functionalities: silicon-bonded hydrogen, silicon-bonded alkenyl, and silanol. Other useful silicone resins include three component terpolymers comprising $R_3SiO_{1/2}$, $SiO_{4/2}$, and $R_2SiO_{2/2}$ structural units, (MQD resins) wherein R is selected from the group consisting of alkyl radicals comprising 1 to 3 carbon atoms and phenyl radical, and wherein the ratio of $R_3SiO_{1/2}$ units to $SiO_2$ is between about 0.6 and about 0.9 inclusive as taught in U.S. Pat. No. 2,736,721 and those taught in Kokai HEI 2-36234, which comprise $R_3SiO_{1/2}$, $SiO_{4/2}$, and $RSiO_{3/2}$ structural units (MQT resins).

Many modifications of silicone adhesives have been suggested in the literature. Such modifications include simplifying or improving methods of preparation, improving shelf life by stabilizing adhesive solution viscosity over time, and improving the balance of adhesive properties (tack, peel, and shear) possessed by such adhesives. Preparation method improvements are taught in U.S. Pat. No. 4,943,620, where ammonia water is used in place of conventional caustic catalysts to effect the condensation reaction between the polydiorganosiloxane and resin, thereby providing an adhesive of consistent quality having greatly improved stability against viscosity changes. Additional methods of improving the viscosity stability of silicone adhesives include addition of isopropanol, as taught in U.S. Pat. No. 4,309,520, as well as process modifications in combination with triorganosiloxy endblocking radicals, as taught in U.S. Pat. Nos. 4,584,355; 4,585,836; and 4,584,394; which provide silicone adhesives having improved viscosity stability, film physical property stability upon aging, and lap shear stability.

Silicone adhesives prepared according to any of the aforementioned references are suitable for use in the instant invention, however, it is preferred that silicone adhesives used in the instant invention be intercondensed prior to their introduction into the acrylic monomer component.

Silicone adhesives prepared by addition-cure chemistry generally comprise polydiorganosiloxanes having alkenyl groups, copolymeric silicone resins comprising $SiO_{4/2}$ and $R_3SiO_{1/2}$ structural units wherein R is as defined previously having one or more of the following functionalities: silicone-bonded hydrogen, silicone bonded alkenyl groups such as those selected from the group consisting of vinyl, allyl, and propenyl; or silanol, optionally a crosslinking or chain extending agent, and platinum or other noble metal hydrosilation catalyst to effect the curing of the silicone adhesive. Examples of such compositions are found in U.S. Pat. Nos. 3,527,842; 3,983,298; 4,774,297; European Patent Publication Nos. 355,991, and 393,426, and Kokai HEI 2-58587. Reported advantages of addition-cured silicone adhesives include reduced viscosity as compared to silicone adhesives prepared via condensation chemistry, higher solids content, stable viscosity with respect to time, and lower temperature cure.

Of this class of silicone adhesives, the compositions of Kokai HEI 2-58587, are particularly well-suited for use in the instant invention. These silicone adhesive compositions are completely soluble in organic solvents, are easily prepared, and after removal of the solvent, readily dissolve in the acrylic monomer component of the instant invention. The other addition-cure silicone adhesives discussed in the above references would also be suitable for use as the silicone adhesive component of the instant invention, given the limitation that after curing such silicone adhesive, the adhesive must readily dissolve in the acrylic monomer component of the present invention. Obtaining solubility of the silicone adhesive in the acrylic monomer requires that crosslinking be minimized by reducing the amount of crosslinking present in the composition to a level where only minimal, if any gel content is present.

A wide range of commercially available silicone adhesives are well suited for use as the silicone adhesive component of the present invention. Examples of such silicone adhesives include but are not limited to Dow Corning's 280A, 282, Q2-7406, and Q2-7566; General Electric's adhesive 590, PSA 600, PSA 595, PSA 610, PSA 518 (medium phenyl content), PSA 6574 (high phenyl content), and PSA 529; Shin-Etsu's KR-100P, KR-100, KR-101-10, and X-40-820, and Rhone-Poulenc's Rhodorsil 353, 354, 356, and 395 (dimethyl/diphenyl gum). Also useful as the silicone adhesive component in the present invention are various blends of silicone adhesives, such as blends of two different dimethylsiloxane-based adhesives, as taught in *The Handbook of Pressure-Sensitive Adhesive Technology* (Satas, 1982), p. 346, or blends of dimethylsiloxane-based adhesives with dimethylsiloxane/diphenylsiloxane-based adhesives as shown in U.S. Pat. No. 4,925,671.

The vibration damping material of the invention comprises acrylic monomer(s), a silicone adhesive, optional photoinitiator, and optional crosslinker. The photoinitiator when irradiated with ultraviolet (UV) radiation initiates polymerization of the acrylic monomers. Photoinitiators which are useful include the benzoin ethers such as benzoin methyl ether or benzoin isopropyl ether, substituted benzoin ethers such as anisoin methyl ether, substituted acetophenones such as 2,2-diethoxyacetophenone and 2,2-dimethoxy-2-phenylacetophenone, substituted alpha-ketols such as 2-methyl-2-hydroxypropiophenone, aromatic sulfonyl chlorides such as 2-naphthalene sulfonyl chloride, and photoactive oximes such as 1-phenyl-1,2-propanedione-2-(O-ethoxycarbonyl)-oxime. The photoinitiator if used is typically present in an amount of about 0.01 to about 5 parts, preferably about 0.01 to about 2 parts, per one hundred parts of acrylic monomer (i.e., alkyl acrylate monomer plus copolymerizable modifier comonomer). It is believed that after polymerization, initiator by-products may be present in the vibration damping material as well as some unreacted photoinitiator depending on the total initiator amount used.

The vibration damping material of the invention may also contain a crosslinking agent, preferably a photoactive crosslinking agent, most preferably a UV photoactive crosslinking agent. The photoinitiator can also be the crosslinking agent. The terms "crosslinking agent" and "crosslinker" are used interchangeably herein. Various types of crosslinking agents are useful. The cured vibration damping material of the present invention has at least a first phase and a second phase. The first phase consists primarily of the silicone adhesive and the second phase consists primarily of acrylic copolymer. The acrylic phase or silicone phase or both the acrylic phase and silicone phase may be continuous. Certain crosslinkers are capable of crosslinking within the acrylic phase (useful when the acrylic phase is continuous). Certain crosslinkers are capable of crosslinking within the silicone phase (useful when the silicone phase is continuous). Other crosslinkers are capable of crosslinking within each individual phase as well as between the two phases (useful when either or both phases are continuous). Preferably, the crosslinker is selected from the group consisting of multifunctional acrylates, triazines, silane coupling agents, benzophenones, and mixtures and derivatives thereof.

One type of crosslinker is a multi-functional acrylate such as 1,6-hexanediol diacrylate as well as those disclosed in U.S. Pat. No. 4,379,201 (Heilmann et al.), (such as trimethylolpropane triacrylate, pentaerythritol tetracrylate, 1,2-ethylene glycol diacrylate, etc.) These crosslinkers are useful in crosslinking the acrylic phase to improve the internal strength of the acrylic phase when the acrylic phase is continuous.

The substituted triazines discussed above include those disclosed in U.S. Pat. Nos. 4,329,384 and 4,330,590, e.g., 2,4-bis(trichloromethyl)-6-p-methoxystyrene-s-triazine. It is believed that the triazines crosslink within each individual phase as well as between the two phases. As discussed above silane coupling agents are also useful in crosslinking. Useful silane coupling agents are epoxy type crosslinkers such as gamma-glycidoxypropyl trimethoxysilane, methacryl type such as gamma-methacryloxypropyltrimethoxysilane, and mercapto type such as gamma-mercaptopropyltrimethoxy silane. As discussed above benzophenone crosslinkers can also be used in the practice of the invention. Crosslinkers are preferably used for applications in which a high shear strength is desired. When used, the crosslinking agent is typically present in an amount of from about 0.01 to about 5 parts by weight per one hundred parts total of acrylic monomer plus silicone adhesive.

The vibration damping material of the invention is typically prepared by the following method. A silicone adhesive is stripped of all of its organic solvent. The solvent can be stripped off and recovered by methods known in the industry. The resulting silicone adhesive is dispersed or dissolved in alkyl acrylate monomer and copolymerizable modifier monomer, following which photoinitiator is added to form the vibration damping material useful in the invention. The silicone adhesive can also be dispersed or dissolved first in the acrylate monomer before adding the copolymerizable modifier monomer, etc. Optional crosslinking agents or other additives such as antioxidants and fillers may also be incorporated into the vibration damping material. The vibration damping material can then be coated onto a suitable substrate and exposed to ultraviolet radiation to obtain a cured vibration damping material.

The viscosity of the vibration damping material can be modified, to obtain a viscosity appropriate for the coating method to be used. For good coatability, the vibration damping material utilized in the invention typically has a viscosity of about 500 to about 40,000 cps. Conventional coating methods such as knife coating and roll coating can be used. At higher viscosities (i.e., above about 40,000 cps) the vibration damping material can be extruded or die coated.

The vibration damping material of the invention can be coated onto a flexible carrier web and polymerized in an inert, i.e., a substantially oxygen-free atmosphere or a nitrogen atmosphere. A sufficiently inert atmosphere can be achieved by covering a layer of the photoactive coating with a plastic film which is substantially transparent to ultraviolet radiation, and irradiating through that film in air using fluorescent-type ultraviolet lamps. If, instead of covering the polymerizable coating, the photopolymerization is to be carried out in an inert atmosphere, the permissible oxygen content of the inert atmosphere can be increased by mixing into the polymerizable monomer an oxidizable tin compound as taught in U.S. Pat. No. 4,303,485 (Levens), which also teaches that such procedures will allow thick coatings to be polymerized in air.

Cured vibration damping materials of the invention, dependent on specific formulation, can be pressure-sensitive vibration damping materials, heat activated vibration damping materials, and non adherent materials. To employ non adherent vibration damping materials requires the use of a bonding agent, i.e., a material to affix the damping material to either a constraining layer and/or a resonating structure depending on the particular use geometry desired.

In the case of cured vibration damping materials providing pressure-sensitive adhesive properties, these materials are typically cured and applied by first making a tape construction which comprises a layer of the vibration damping material evenly coated between two liners at least one of which is coated with a release material. A transfer tape can be made by coating the composition between two liners both of which are coated with a release coating. The release liners typically comprise a clear polymeric material such as polyester that is transparent to ultraviolet radiation. Preferably, each release liner is first coated or primed with a release material which is incompatible with the vibration damping materials utilized in the invention. For example, silicone release liners can be used for compositions containing high amounts of acrylic monomer compared to silicone adhesive, e.g., 90 parts acrylic monomer, 10 parts silicone adhesive. Vibration damping materials with higher concentrations of silicone adhesive can be coated onto release liners coated with other release compositions such as those comprising polyfluoropolyether or fluorosilicone. Vibration damping materials containing phenyl silicone adhesives can be coated onto liners coated with a methyl silicone release composition.

Useful release liners include those that are suitable for use with silicone adhesives and organic pressure-sensitive adhesives. One example is the polyfluoropolyether disclosed in copending U.S. patent application Ser. No. 07/450,623. Other useful release liner release coating compositions are described in European Patent Publication No. 378420, U.S. Pat. No. 4,889,753, and European Patent Publication No. 311262. Commercially available liners and compositions include Dow Corning® Syl-off™ 7610 polydimethylsiloxane release coating, and Q2-7785 fluorosilicone release coating; Shin-Etsu X-70-029NS fluorosilicone release coatings; and the like.

The adhesive compositions of the invention can also be coated onto a differential release liner; i.e., a release liner having a first release coating on one side of the liner and a second release coating coated on the opposite side. The two release coatings should have different release values. For example, one release coating may have a release value of 5 grams/cm (i.e., 5 grams of force is needed to remove a strip of material 1 cm wide from the coating) while the second release coating has a release value of 15 grams/cm. The vibration damping material is typically coated over the release liner coating having the higher release value. The resulting tape can be wound into a roll. As the tape is unwound, the vibration damping material adheres to the release coating with the higher release value. After the tape is applied to a substrate, the release liner can be removed to expose an adhesive surface for further use.

The vibration damping material may be cured by exposure to ultraviolet radiation which is transmitted through the release liner(s). When a transfer tape is made, one of the liners can be removed and the exposed surface laminated to a constraining layer. The remaining release liner aids in subsequently transferring the vibration damping material with the constraining layer to the resonating structure.

The vibration damping materials of the invention having pressure sensitive adhesive qualities adhere well to polyesters, polycarbonates, and polyolefins (e.g., polyethylene, and polypropylene) which are traditionally known to be difficult materials to bond to.

Photopolymerization of the vibration damping materials by exposure to ultraviolet radiation yields materials separated into first and second phases. The first phase consists primarily of the silicone adhesive and the second phase consists primarily of acrylic copolymer. Factors influencing the morphology i.e., which phase is continuous and which phase is discontinuous, include the ratio of acrylic monomer to silicone adhesive, the particular modifier monomer used, the ratio of alkyl acrylate monomer to modifier monomer, and the processing conditions employed to cure the composition.

For example, vibration damping materials containing lower concentrations of silicone adhesive (i.e., a higher ratio of acrylic monomer to silicone adhesive) favor the formation of a continuous acrylic phase having a silicone phase dispersed therein. Conversely, vibration damping materials compositions having higher silicone adhesive concentrations favor the formation of a continuous silicone phase having an acrylic phase dispersed therein. The concentration and polarity of the system components can be varied widely to obtain the desired damping performance. Either phase may be continuous. Alternatively, both phases may be continuous.

Testing Procedures

The tests were used to evaluate the vibration damping materials. All percentages, parts and ratios within the detailed description, the examples and the claims are by weight unless specifically stated otherwise.

Damping Properties (Loss Factor and Storage Modulus)

These properties were determined on a Polymer Laboratories Dynamic Mechanical Thermal Analyzer (DMTA) Mark II using a technique of multiplexing frequency during a thermal scan, that is, properties were measured while both the frequency and temperature were changing. The temperature was varied from −50° C. to 200° C. at the rate of 2° C./minute continuous. Measurements were taken at frequencies of 0.1, 0.3, 3, 20, and 50 Hz. Sample thickness was about 30 mils and was obtained by laminating several layers of cured vibration damping material under pressure through a nip roller.

Desirably, over significant portions of the temperature range of −50° C. to 200° C., and at a frequency of 3Hz, vibration damping materials according to the invention display a storage modulus above the rubbery plateau (e.g. above about 0.01 MPa) and a loss tangent above 0.5, preferably above 0.7.

180° Peel Adhesion 2 mil (51 µm) thick cured vibration damping material on a polyester backing and covered with a release liner were cut into 0.5 inch (13 cm) by 6 (15 cm) inch strips. The release liner was removed and the strip adhered to a 4 inch (10 cm) by 8 inch (20 cm) clean, solvent washed glass coupon using a 4½ pound (2 kg) roller passed twice over the strip. The bonded assembly dwelled at room temperature for about twenty minutes and was tested for 180° peel adhesion using an I-Mass peel tester at a separation rate of 12 inches/minute (30.5 cm/minute) over a 10 second data collection time. Two samples were tested; the reported adhesion value is an average of the two samples. Preferably, the vibration damping materials have a 180° C. peel adhesion of at least about 5 oz./inch, more preferably at least about 20 oz./inch.

General Sample Preparation

The general preparation of vibration damping materials of the invention will be described. Silicone adhesive was dried for 6 hours at a temperature of 150° C. in a forced air oven to obtain a silicone adhesive that was substantially solvent-free. To the dried silicone adhesive were added the desired charge of alkyl acrylate and, optionally, the modifying monomer(s). To this solution were added 0.2 phr of KB-1 photoinitiator, and 0.1 phr of 2,4-bistrichloromethyl-6-(4-methoxyphenyl)-s-triazine as disclosed in U.S. Pat. No. 4,330,590 (Vesley). The solution was agitated to dissolve the photoinitiator and the photocrosslinker. The solution was then knife coated to a uniform thickness of 2 mils (51 µm) onto a 2 mil (51 µm) thick PET film, which had been coated with a release agent. A second PET film as described above was placed over the applied solution with the release coated side facing the solution. The solution was polymerized by exposure to a bank of ultraviolet fluorescent lamps. 90% of the emissions were between 300 and 400 nm (nanometers) with a maximum at 351 nm and which provide radiation intensity of approximately 1.6–3.9 mW/cm. Total exposure was about 500 mJ/cm (Dynachem units).

The following terminology, abbreviations, and trade names are used in the general preparation and the examples:

| | |
|---|---|
| IOA | isooctyl acrylate |
| AA | acrylic acid |
| BA | butyl acrylate |
| IBnA | isobornyl acrylate |
| KB-1 | 2,2 dimethoxy-2-phenyl acetophenone photoinitiator available from Sartomer |
| DMA | dimethylacrylamide |
| PET | polyethylene terephthalate |

EXAMPLE 1

Figure 2:
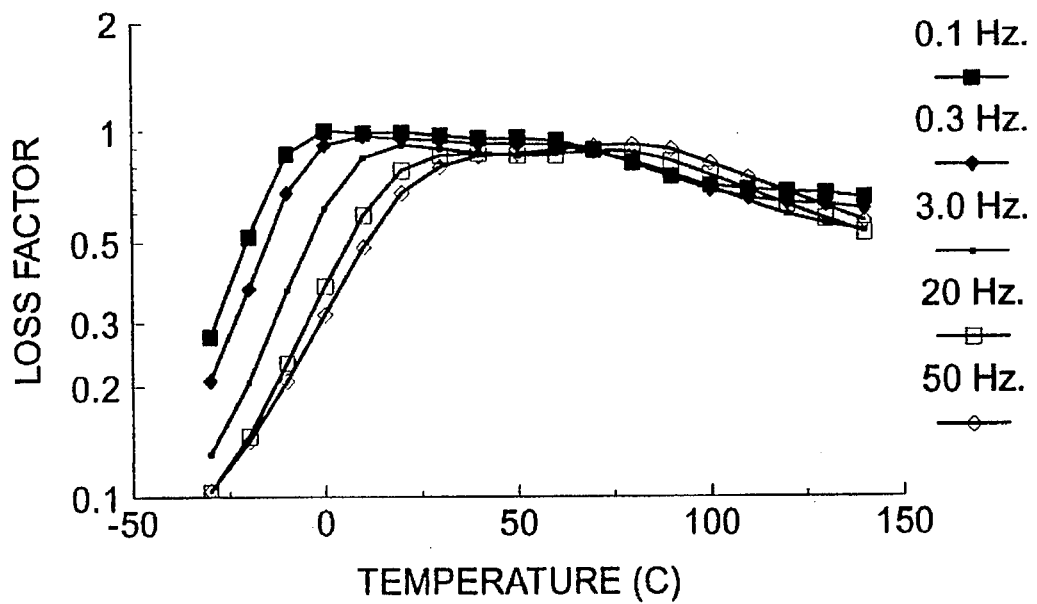
FIG. 2 is a graphical representation of loss factor versus temperature for the vibration damping material of example 1 at several frequencies.

A cured vibration damping material was prepared according to the general preparation outlined above using 75 parts IOA, 25 parts AA and 100 parts dried silicone adhesive (Q2-7406 available from Dow Corning). The storage modulus (G') and loss factor (tan δ) were measured at 0.1 Hz, 0.3 Hz, 20 Hz and 50 Hz and are presented graphically in FIGS. 1 and 2. Both modulus and tan δ exhibited high values over a broad temperature range and demonstrated good damping performance.

EXAMPLES 2 TO 5

Cured vibration damping materials were made as in example I using 80 parts IOA, 20 parts AA and 100 parts of various dried silicone adhesives. The damping materials were coated and cured on a PET film to thickness of about 2 mils (51 μm) to about 5 mils. Several layers of each cured damping material were then laminated, under pressure, through a nip roller to obtain a laminate about 30 mils (0.76 mm) thick. The laminate was tested for its vibration damping properties.

Figure 3:
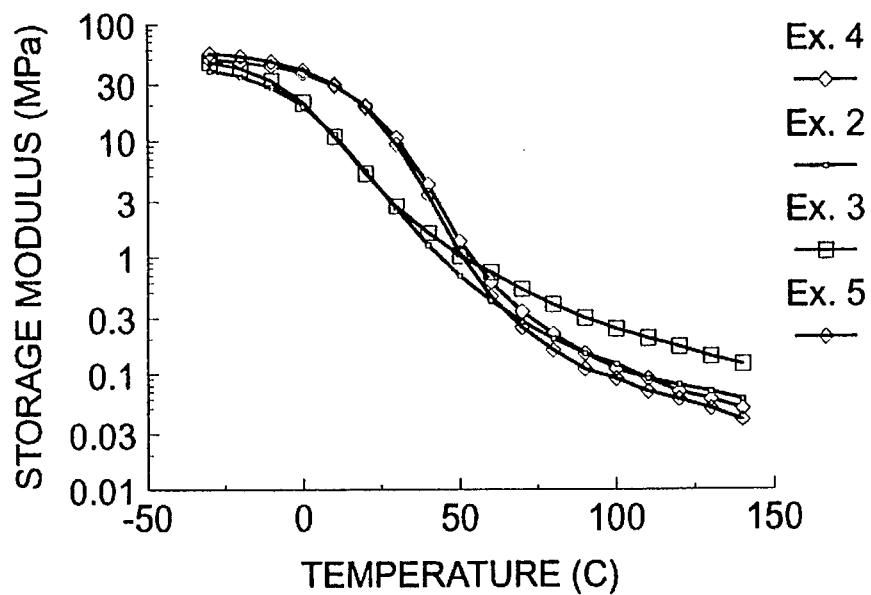
FIG. 3 is a graphical representation of storage modulus versus temperature for the vibration damping materials of examples 2 to 5.
Figure 4:
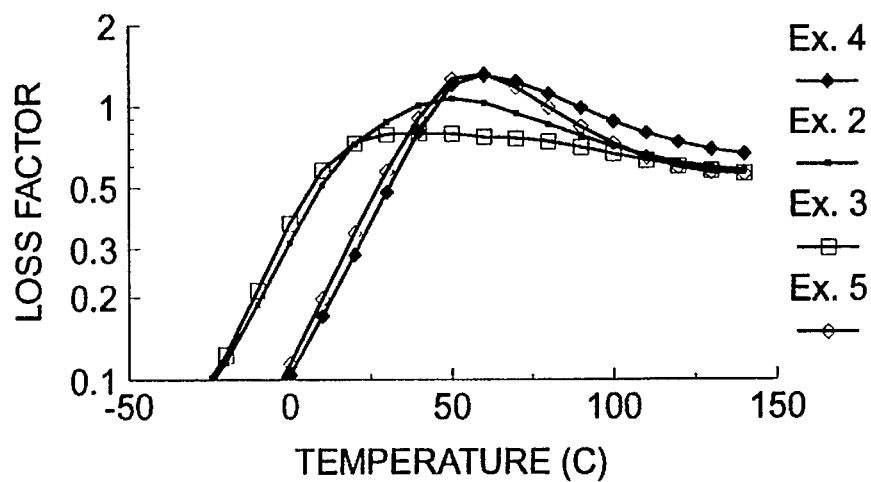
FIG. 4 is a graphical representation of loss factor versus temperature for the vibration damping materials of examples 2 to 5.

The silicone adhesives used in these examples are reported in Table 1 below. The storage modulus and loss factor (measured at 3 Hz over −50° to 150° C.) are presented graphically in FIGS. 3 and 4 respectively.

TABLE 1

| Example No. | Silicone Adhesive |
| --- | --- |
| 2 | Q2-7406 (Dow Corning) |
| 3 | X2-7735 (Dow Corning) |
| 4 | PSA 6573A (General Electric) |
| 5 | PSA 529 (General Electric) |

The graphs show that both the modulus and loss factor are high over a broad temperature range indicating that these compositions are useful on vibration damping materials.

EXAMPLES 6 AND 7

Figure 5:
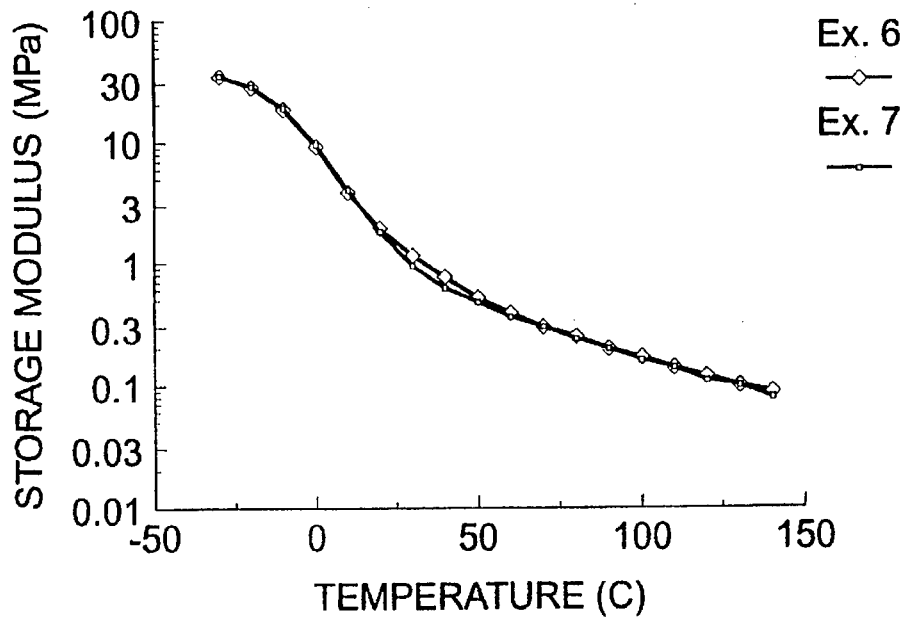
FIG. 5 is a graphical representation of storage modulus versus temperature for the vibration damping materials of examples 6 and 7.
Figure 6:
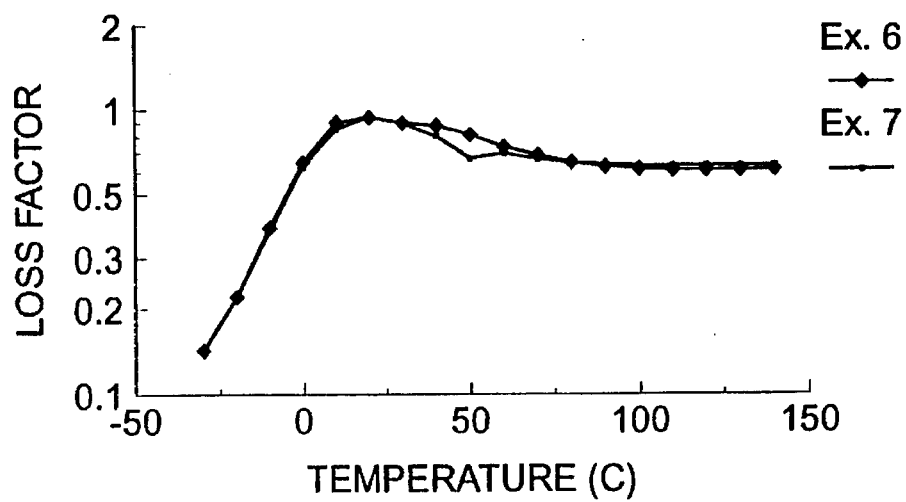
FIG. 6 is a graphical representation of loss factor versus temperature for the vibration damping materials of examples 6 and 7.
Figure 7:
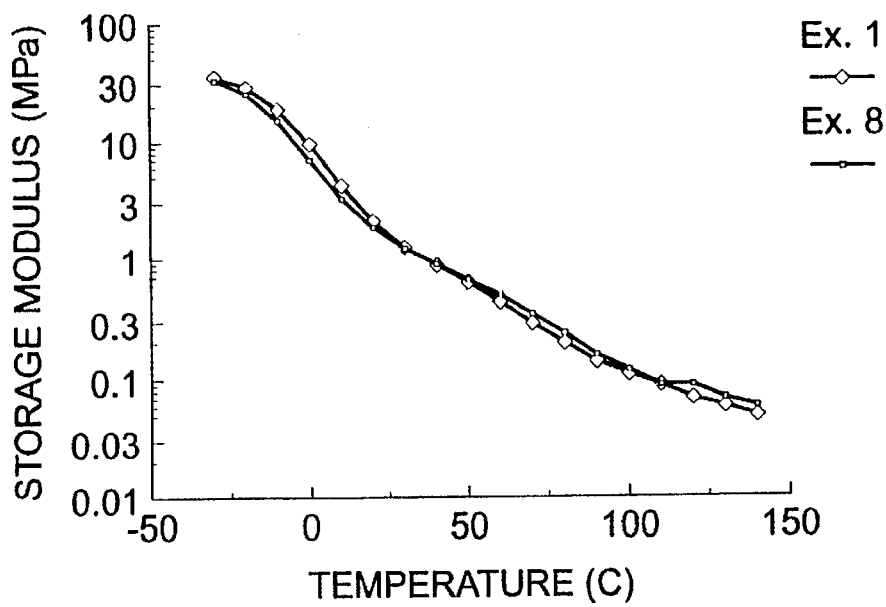
FIG. 7 is a graphical representation of storage modulus versus temperature for the vibration damping materials of examples 1 and 8.
Figure 8:
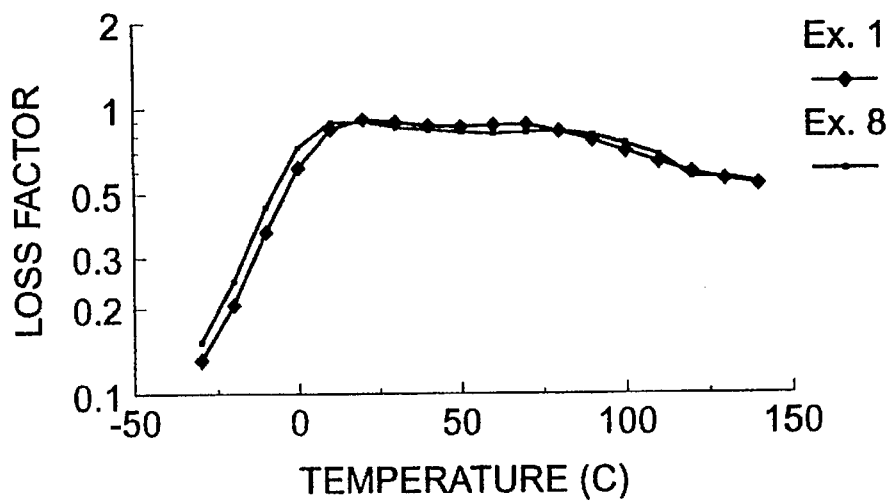
FIG. 8 is a graphical representation of loss factor versus temperature for the vibration damping materials of examples 1 and 8.
Figure 9:
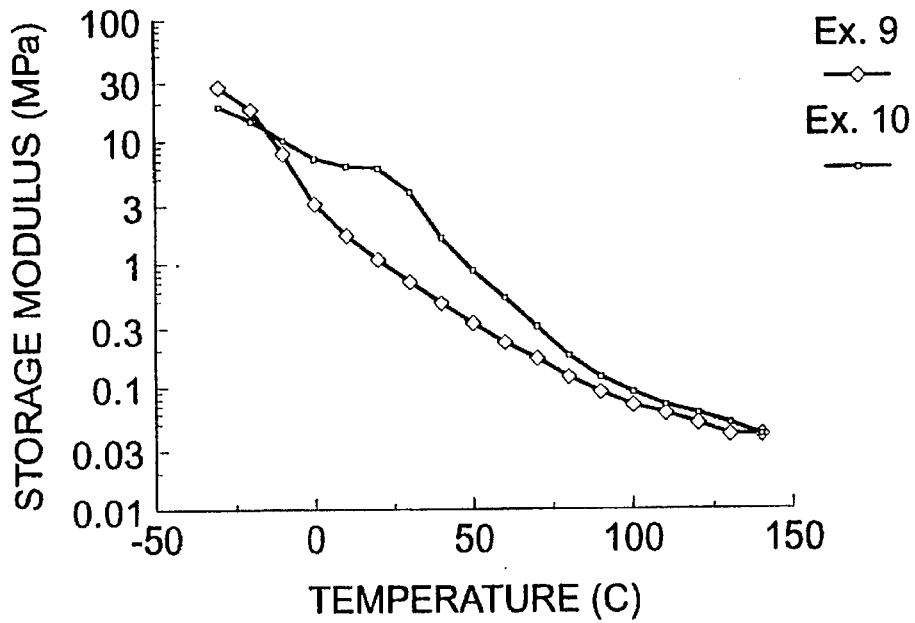
FIG. 9 is a graphical representation of storage modulus versus temperature for the vibration damping materials of examples 9 and 10.
Figure 10:
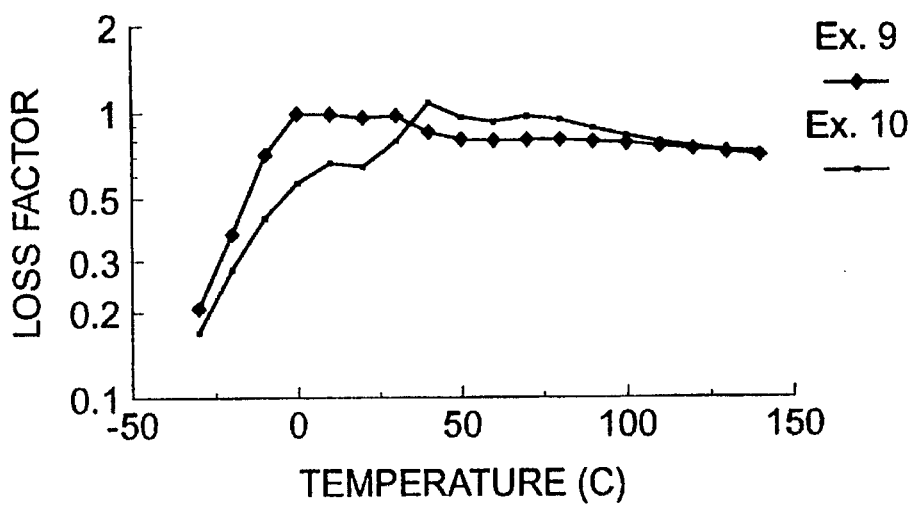
FIG. 10 is a graphical representation of loss factor versus temperature for the vibration damping materials of examples 9 and 10.
Figure 11:
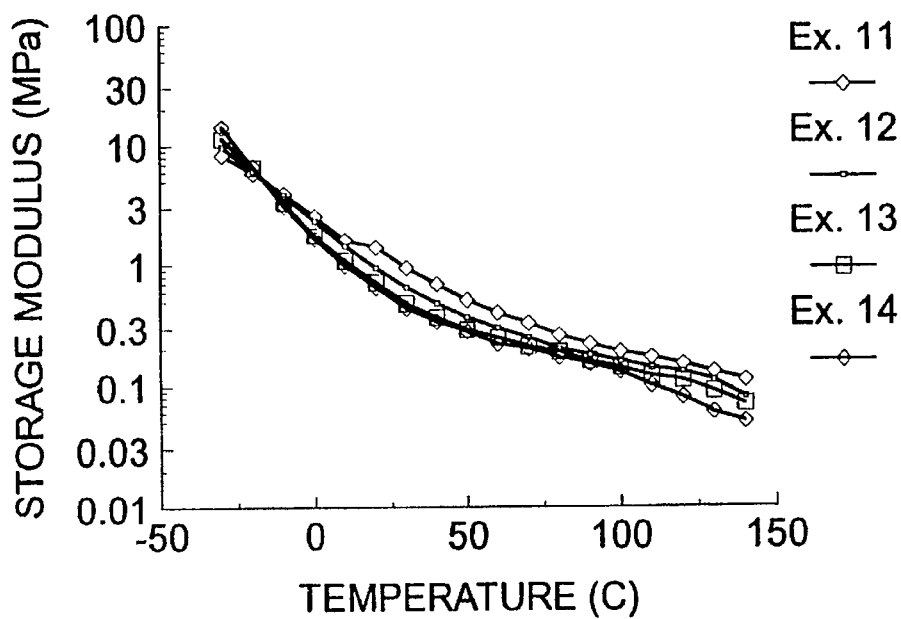
FIG. 11 is a graphical representation of storage modulus versus temperature for the vibration damping materials of examples 11 to 14.
Figure 12:
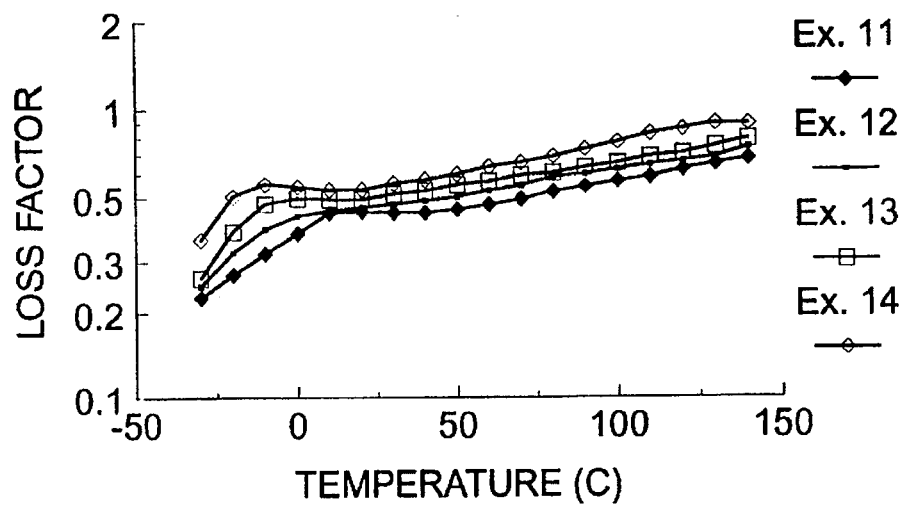
FIG. 12 is a graphical representation of loss factor versus temperature for the vibration damping materials of examples 11 to 14.

Examples 6 and 7 were made as in example 1 except using BA, AA and Q2-7406 silicone adhesive. Ratios of the components used are given in Table 2 below. Testing was performed as in examples 2 to 5. The storage modulus and loss factor measured at 3 Hz are graphically presented in FIGS. 5 and 6 respectively.

TABLE 2

| Example No. | Ratio BA:AA | Ratio Acrylic Monomers:Silicone |
| --- | --- | --- |
| 6 | 80:20 | 50:50 |
| 7 | 85:15 | 50:50 |

From the graphs it can be seen that storage modulus and loss factor are high over a broad temperature range indicating BA/AA/silicone compositions are useful as vibration damping materials.

EXAMPLES 8 TO 15

A series of examples was prepared as in example 1, except using different modifier monomers, IOA and Q2-7406 as shown below in Table 3. Testing was performed as in examples 2 to 5. The storage modulus and loss factor measured at 3 Hz are graphically presented in FIGS. 7 to 12 respectively.

TABLE 3

| Example No. | Modifier Monomer | Ratio IOA:Monomer | Ratio Acrylic Monomer:Silicone |
| --- | --- | --- | --- |
| 1 | AA | 75:25 | 50:50 |
| 8 | AA | 70:30 | 50:50 |
| 9 | IBnA | 50:50 | 50:50 |
| 10 | IBnA | 25:75 | 50:50 |
| 11 | DMA | 80:20 | 50:50 |

TABLE 3-continued

| Example No. | Modifier Monomer | Ratio IOA:Monomer | Ratio Acrylic Monomer:Silicone |
| --- | --- | --- | --- |
| 12 | DMA | 85:15 | 50:50 |
| 13 | DMA | 90:10 | 50:50 |
| 14 | DMA | 95:5 | 50:50 |

FIGS. 7, 8, 9, 10, 11 and 12 show that varying the modifier monomer type and concentration in compositions of the instant invention, provides materials having broad transitions, high loss factors, and a range of storage moduli.

EXAMPLE 15 TO 18

In these examples, the type and amount of modifier monomer were varied in vibration damping materials containing IOA as the acrylate monomer and a silicone adhesive having a high phenyl content (PSA 6574, 13 mole % diphenylsiloxane commercially available from General Electric). Vibration damping materials were prepared and tested as in examples 2 to 5 using the components and ratios outlined in Table 4 below. Test results are graphically represented in FIGS. 13 to 16 respectively.

TABLE 4

| Example No. | Modifier Monomer | Ratio IOA: Modifier | Ratio Acrylic Monomer:Silicone |
| --- | --- | --- | --- |
| 15 | AA | 80:20 | 50:50 |
| 16 | AA | 50:50 | 50:50 |
| 17 | DMA | 80:20 | 50:50 |
| 18 | DMA | 50:50 | 50:50 |

Figure 13:
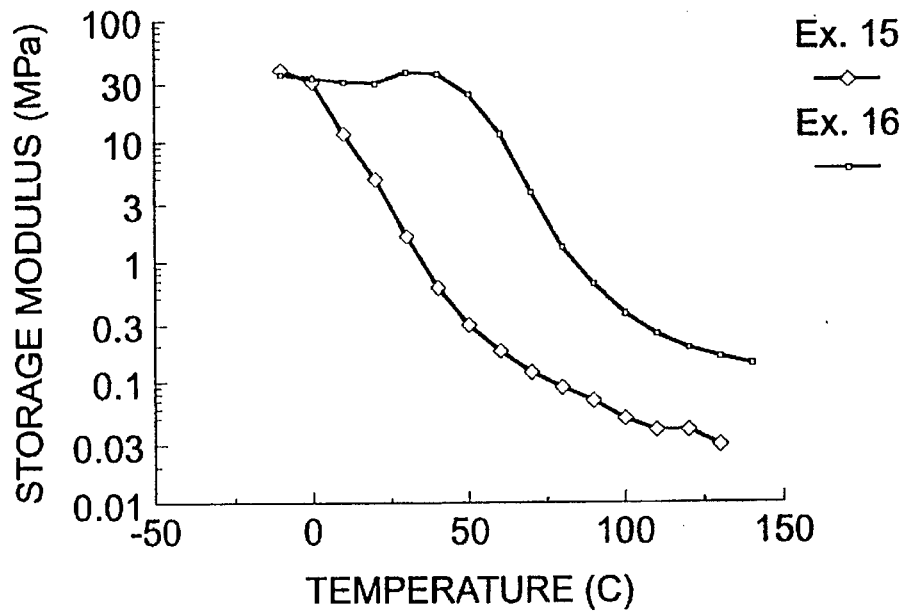
FIG. 13 is a graphical representation of storage modulus versus temperature for the vibration damping materials of examples 15 and 16.
Figure 14:
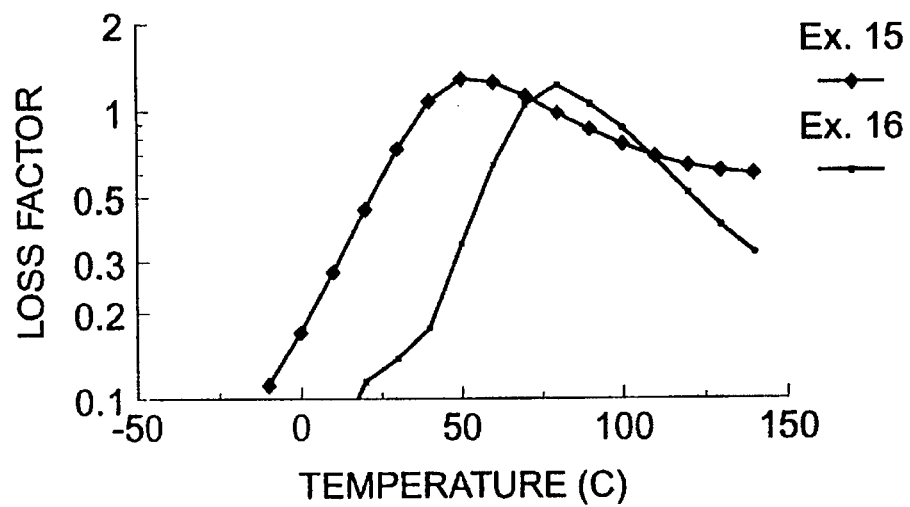
FIG. 14 is a graphical representation of loss factor versus temperature for the vibration damping materials of examples 15 and 16.
Figure 15:
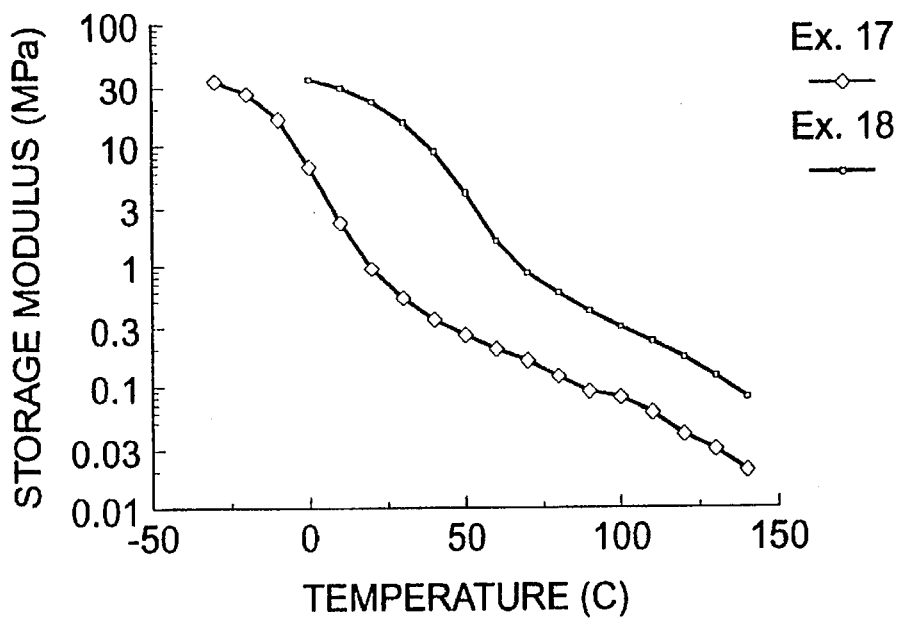
FIG. 15 is a graphical representation of storage modulus versus temperature for the vibration damping materials of examples 17 and 18.
Figure 16:
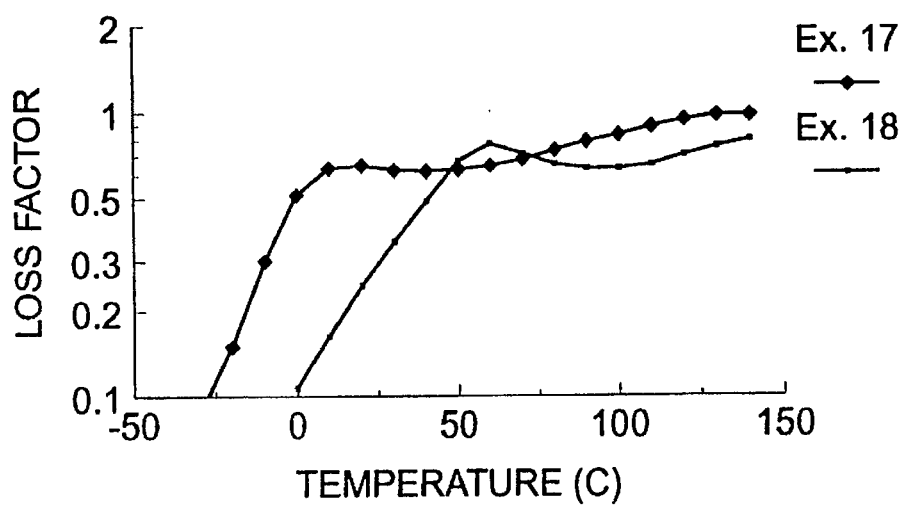
FIG. 16 is a graphical representation of loss factor versus temperature for the vibration damping materials of examples 17 and 18.
Figure 17:
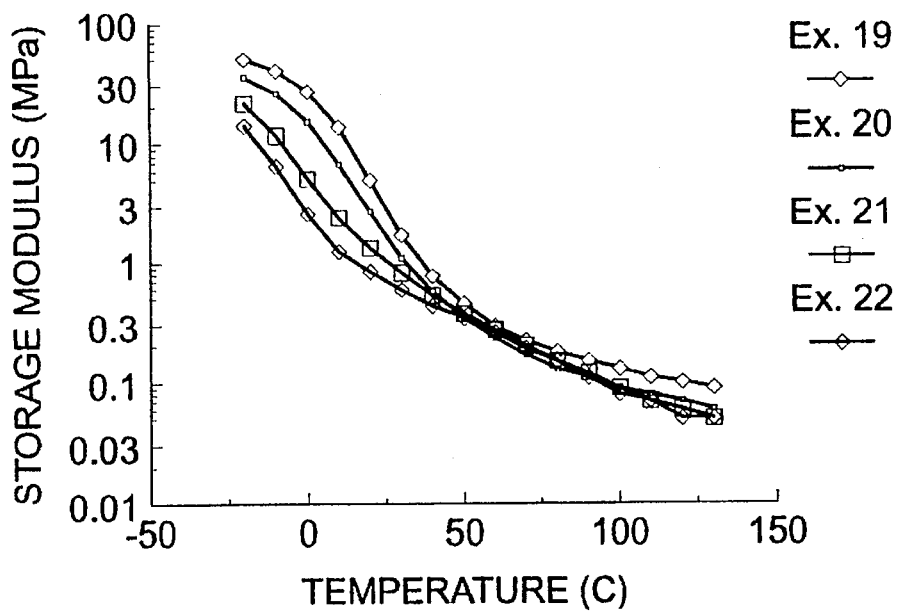
FIG. 17 is a graphical representation of storage modulus versus temperature for the vibration damping materials of examples 19 to 22.
Figure 18:
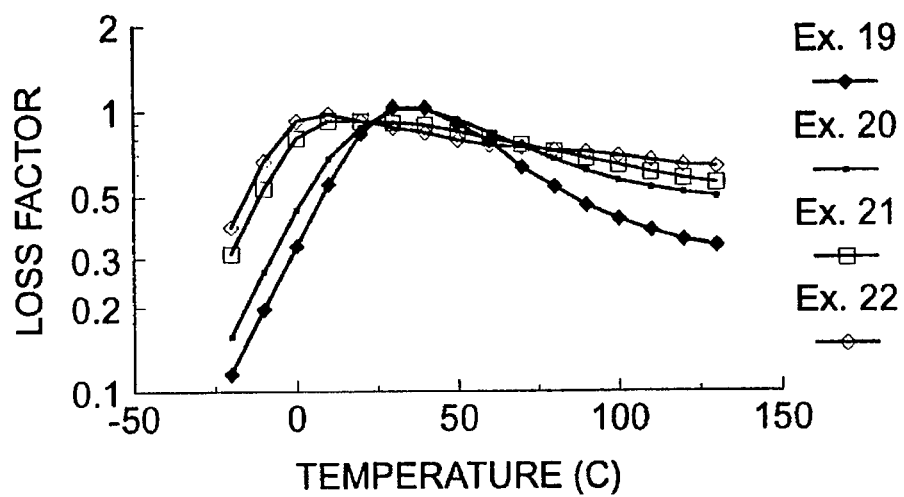
FIG. 18 is a graphical representation of loss factor versus temperature for the vibration damping materials of examples 19 to 22.
Figure 19:
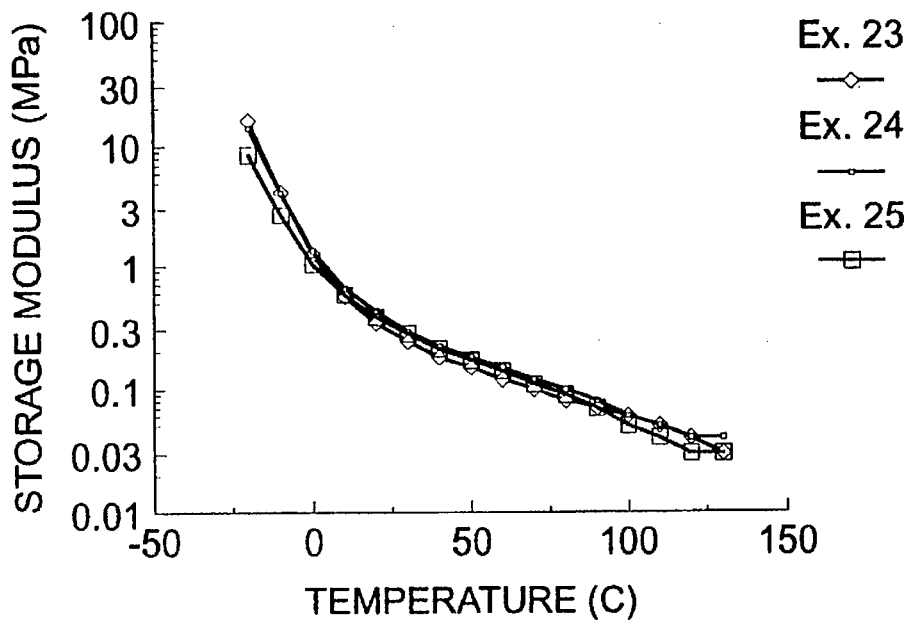
FIG. 19 is a graphical representation of storage modulus versus temperature for the vibration damping materials of examples 23 to 25.
Figure 20:
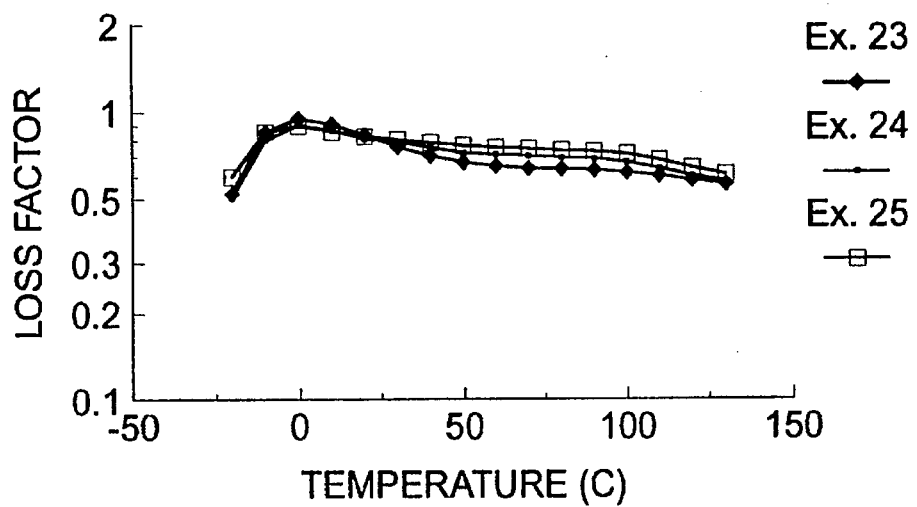
FIG. 20 is a graphical representation of loss factor versus temperature for the vibration damping materials of examples 23 to 25.
Figure 21:
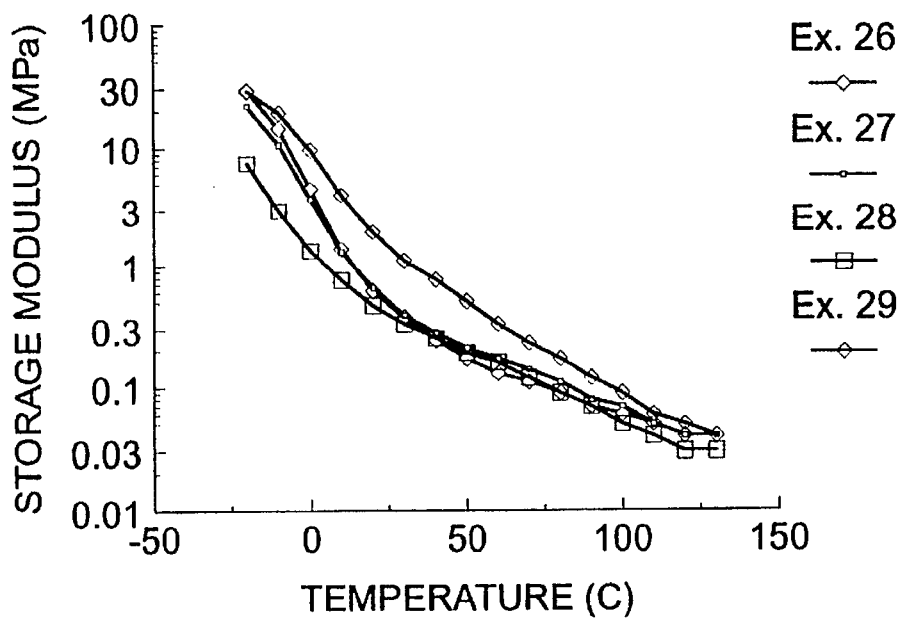
FIG. 21 is a graphical representation of storage modulus versus temperature for the vibration damping materials of examples 26 to 29.
Figure 22:
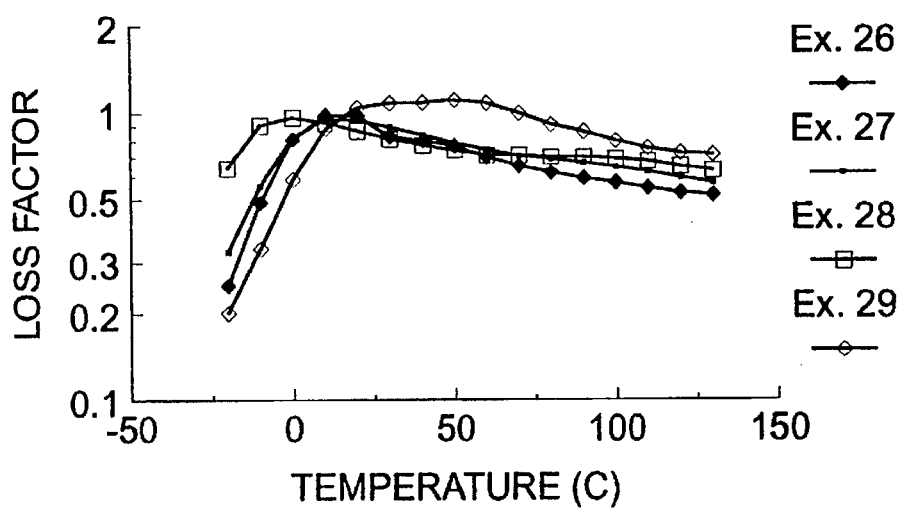
FIG. 22 is a graphical representation of loss factor versus temperature for the vibration damping materials of examples 26 to 29.
Figure 23:
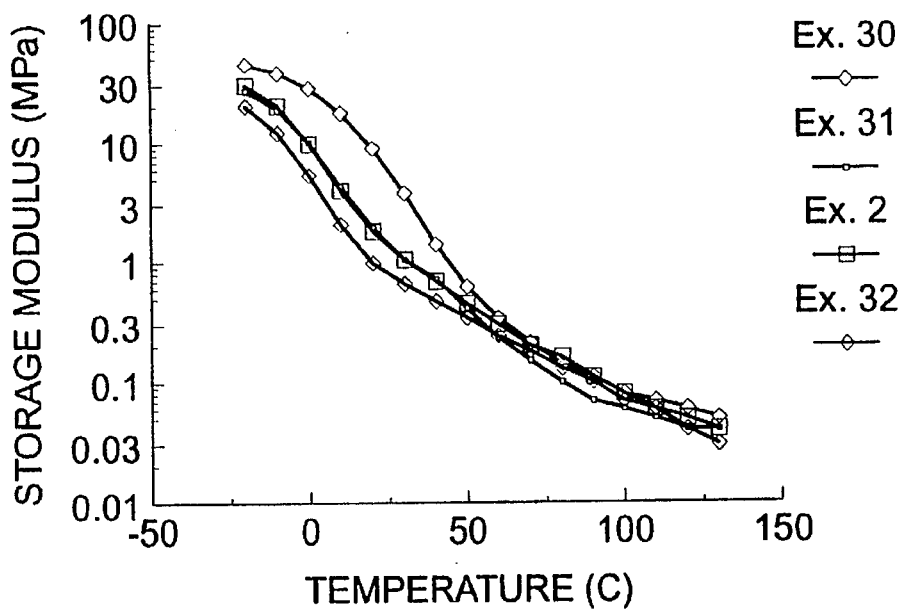
FIG. 23 is a graphical representation of storage modulus versus temperature for the vibration damping materials of examples 2 and 30 to 32.
Figure 24:
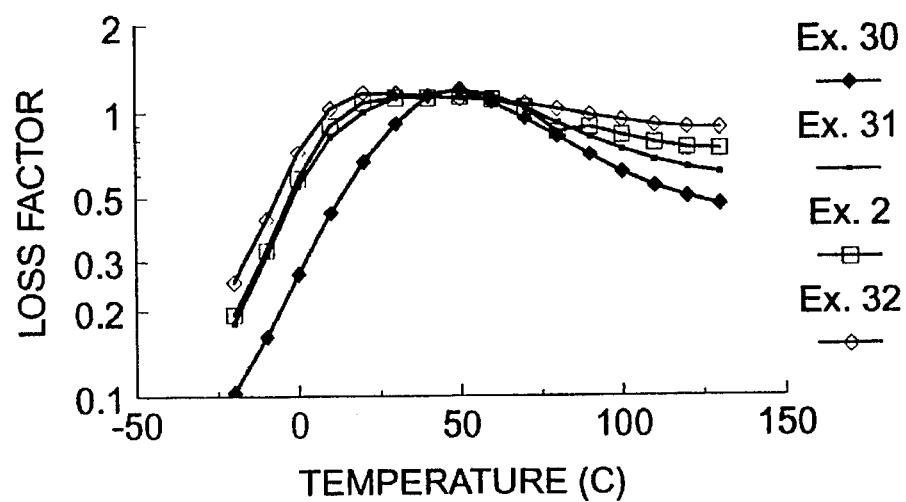
FIG. 24 is a graphical representation of loss factor versus temperature for the vibration damping materials of examples 2 and 30 to 32.
Figure 25:
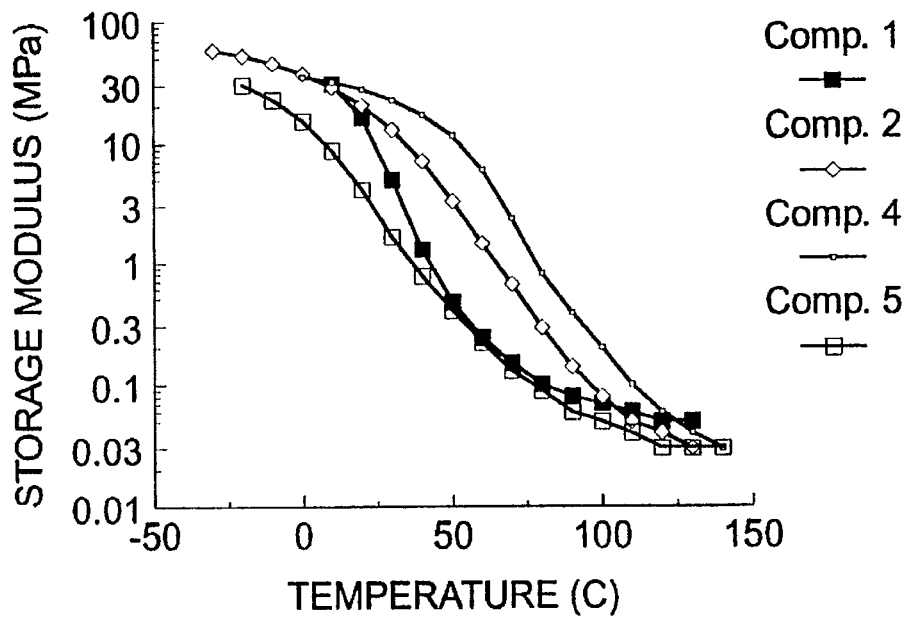
FIG. 25 is a graphical representation of storage modulus versus temperature for the materials of comparative examples 1, 2, 4, 5.
Figure 26:
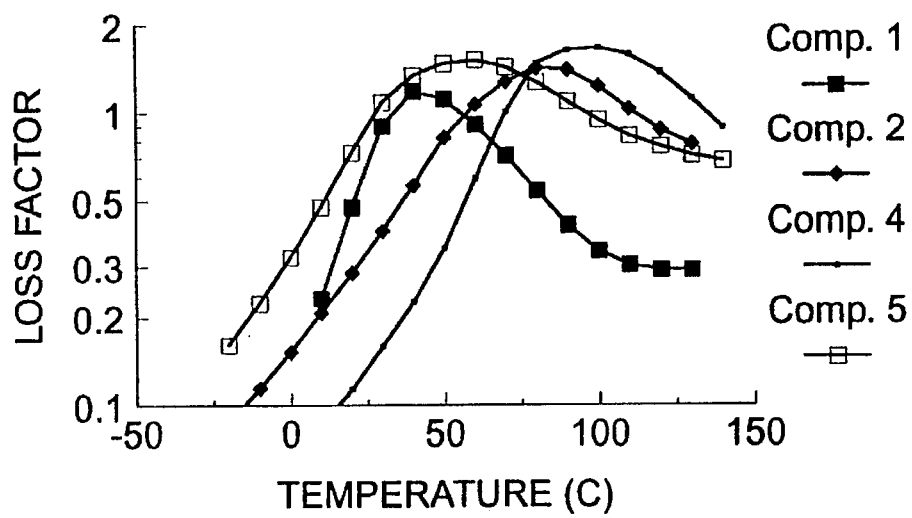
FIG. 26 is a graphical representation of loss factor versus temperature for the materials of comparative examples 1, 2, 4, 5.
Figure 27:
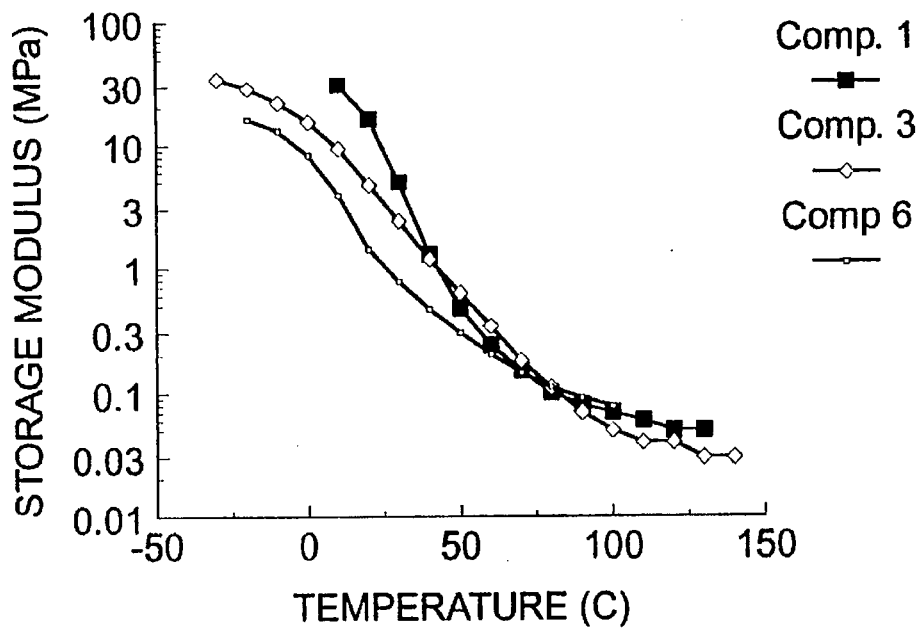
FIG. 27 is a graphical representation of storage modulus versus temperature for the materials of comparative examples 1, 3, and 6.
Figure 28:
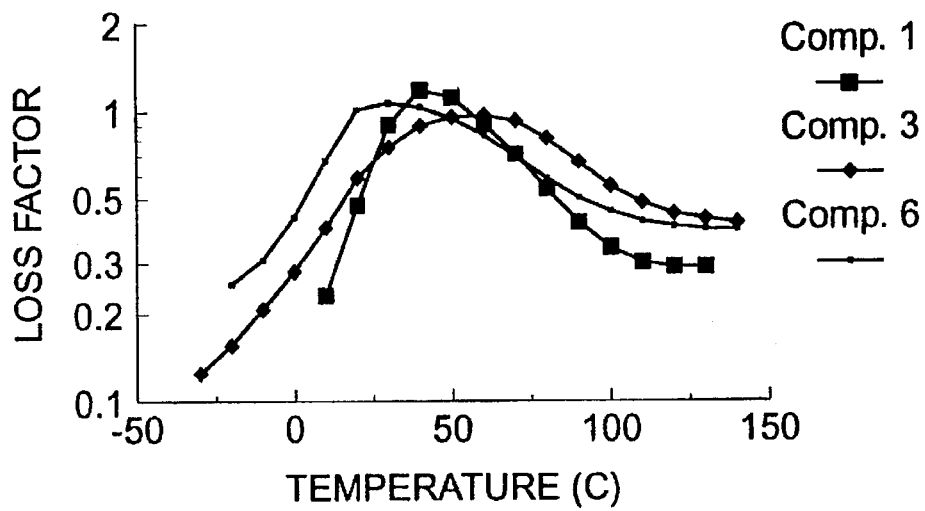
FIG. 28 is a graphical representation of loss factor versus temperature for the materials of comparative examples 1, 3 and 6.

From FIGS. 13 and 14, it can be seen that as the amount of AA increases, the temperature at which the transition occurs increases. From FIGS. 15 and 16, it can be seen that when DMA is used as the modifier monomer, the transitions become broader and the peak loss factors move to elevated temperatures, i.e. to greater than 140° C.

EXAMPLES 19 TO 32

In these examples, the ratio of acrylate monomer to modifier monomer, and the amount of silicone adhesive was varied. Fifteen samples were prepared as in examples 2–5 and tested as in examples 2–5 using IOA, AA, and Q2-7406 in the ratios listed in Table 5 following. Test results are graphically represented in FIGS. 17 to 24 respectively. In addition, examples 2, 21, 25, 26, and 28 were tested for 180 degree peel adhesion according to the test method described hereinabove. Results are given in Table 6 below.

TABLE 5

| Example No. | Ratio IOA:AA | Ratio Acrylate Monomer:Silicone |
| --- | --- | --- |
| 19 | 85:15 | 70:30 |
| 20 | 85:15 | 60:40 |
| 21 | 85:15 | 50:50 |
| 22 | 85:15 | 40:60 |
| 23 | 95:05 | 70:30 |
| 24 | 95:05 | 60:40 |
| 25 | 95:05 | 50:50 |
| 26 | 90:10 | 70:30 |
| 27 | 90:10 | 60:40 |
| 28 | 90:10 | 50:50 |
| 29 | 90:10 | 40:60 |

TABLE 5-continued

| Example No. | Ratio IOA:AA | Ratio Acrylate Monomer:Silicone |
|---|---|---|
| 30 | 80:20 | 70:30 |
| 31 | 80:20 | 60:40 |
| 2 | 80:20 | 50:50 |
| 32 | 80:20 | 40:60 |

TABLE 6

| Example No. | Peel Adhesion (oz/inch) |
|---|---|
| 2 | 46 |
| 21 | 48 |
| 25 | 48 |
| 26 | 42 |
| 28 | 54 |

From FIGS. 17 to 24, it can be seen that, in general, the storage modulus transition is broad and gradual and that the loss factor is high over the temperature range tested. From the adhesion data, it can be seen that these vibration damping materials are useful as pressure sensitive adhesives.

COMPARATIVE EXAMPLES 1 TO 7

Commercially available silicone adhesives were tested for their vibration damping properties. A commercially available and a laboratory prepared acrylic based vibration damping material were also tested. The comparative silicone adhesives were prepared as follows: a catalyst solution containing 20 weight % Cadox(TM) TS-50 (2,4-dichlorobenzoyl peroxide, commercially available from Akzo Chemical Inc.) in toluene was added to each silicone adhesive to provide 0.5 parts peroxide per 100 parts silicone solids. The adhesive solution was further diluted with toluene to 50 weight % solids and applied via a knife coater onto 2 mil thick release coated biaxially-oriented PET film to provide a dry film of 2 mil (51 µm) thickness. The resultant silicone coating was cured by exposing the sample in a forced air oven for 1 minute at 70° C. followed by 2 minutes at 175° C. Samples were subsequently laminated to provide 30 mil (0.15 cm) thick sections for determination of vibration damping properties.

The commercially available acrylic based vibration damping material (ISD 110, 3M Company) was used as received and laminated to provide a 30 mil (0.15 cm) thick sample for testing.

The laboratory prepared acrylic sample (Comparative example 7) was prepared by weighing 80 parts BA, 20 parts AA, and 0.04 parts KB-1 into a vessel and sparging with nitrogen gas for 20 minutes. The solution was then partially polymerized by exposure to UV lamps as described above to a viscosity of about 3000 cps. To this partially polymerized sample was added 0.16 parts additional KB-1 and 0.1 parts crosslinker used in general sample preparation. This sample was then coated, cured, and laminated as described in the general sample preparation section.

Figure 29:
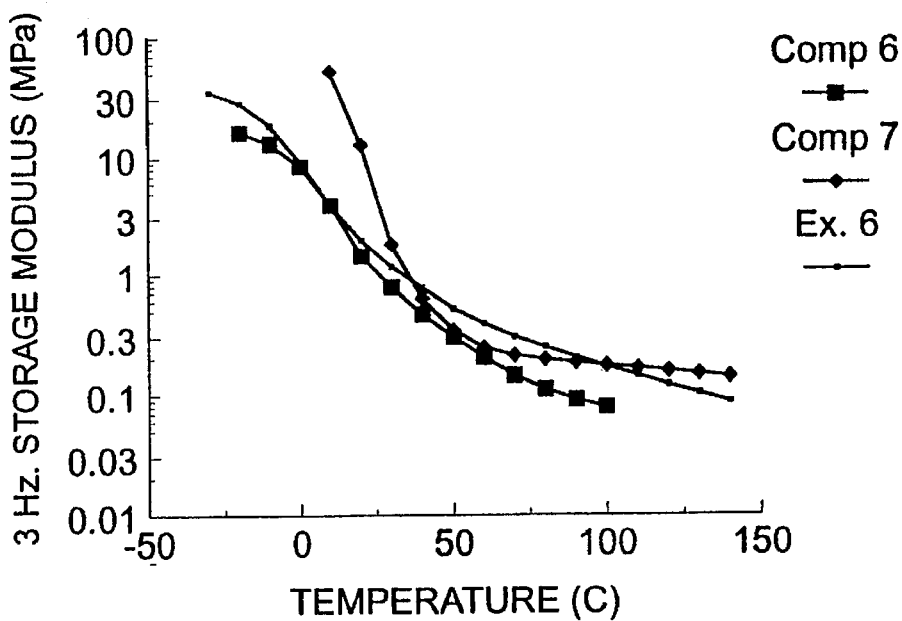
FIG. 29 is a graphical representation of storage modulus at 3 Hz versus temperature for the vibration damping material of example 6 and for the materials of comparative examples 6 and 7.
Figure 30:
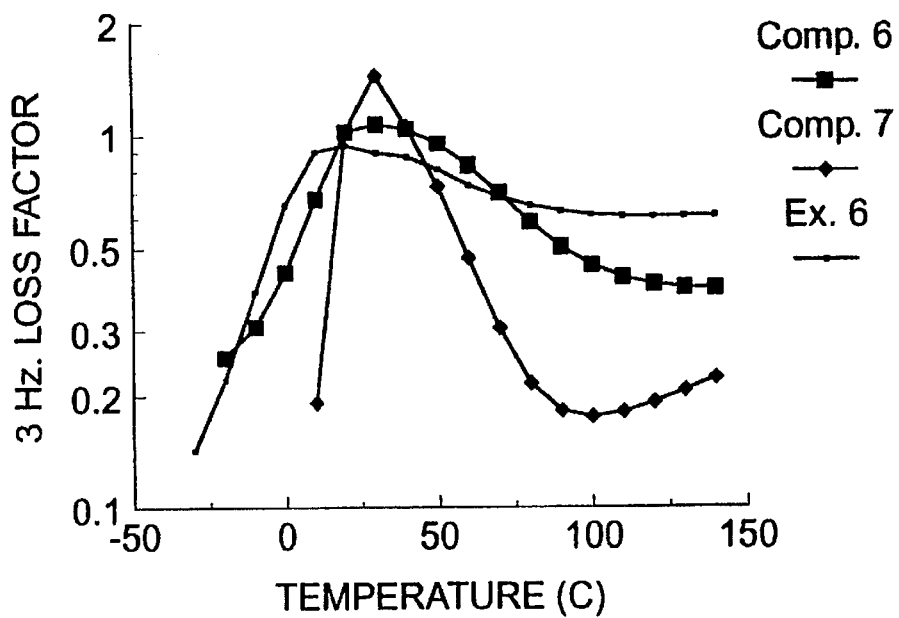
FIG. 30 is a graphical representation of loss factor at 3 Hz versus temperature for the vibration damping material of example 6 and for the materials of comparative examples 6 and 7.

The materials were tested as in examples 2 to 5 using the materials listed in Table 7. Test results are graphically presented in FIGS. 25 to 30. Example 6, a vibration damping material of the invention, is also represented on FIGS. 29 and 30.

TABLE 7

| Comp. Ex. No. | Identification | Supplier |
|---|---|---|
| Comp. 1 | ISD 110 | 3M Company Inc. |
| Comp. 2 | PSA 529 | General Electric |
| Comp. 3 | X2-7735 | Dow Corning |
| Comp. 4 | PSA 6573A | General Electric |
| Comp. 5 | PSA 6574 | General Electric |
| Comp. 6 | Q2-7406 | Dow Corning |
| Comp. 7 | 80:20 BA:AA | N/A |

From FIGS. 25 to 30 it can be seen that the loss factor peaks are generally lower and narrower when compared to vibration damping materials of the invention containing both silicone adhesive and acrylic monomer.

Reasonable variations and modifications are possible within the scope of the foregoing specification and drawings without departing from the invention which is defined in the accompanying claims.

We claim:

1. A constrained layer vibration damper comprising a layer of vibration damping material bonded to a stiff constraining layer, wherein the vibration damping material is the polymerization product of a radiation curable material that consists essentially of (a) from about 5 parts to about 95 parts by weight polymerizable acrylic monomer, and (b) correspondingly, from about 95 parts to about 5 parts by weight of a preformed silicone adhesive that is the reaction product of one or more polydiorganosiloxanes and one or more copolymeric silicone resins, wherein the sum of (a) plus (b) equals 100 parts by weight.

2. A constrained layer vibration damper according to claim 1 wherein the radiation curable material consists essentially of:
   (a) from about 5 parts to about 95 parts by weight polymerizable acrylic monomer, wherein the polymerizable acrylic monomer comprises:
      (i) from about 5 parts to about 100 parts by weight of an alkyl acrylate monomer, the alkyl groups of which have an average of about 4 to about 14 carbon atoms; and
      (ii) correspondingly, from about 95 parts to about 0 parts by weight of a monoethylenically unsaturated modifier monomer copolymerizable with the alkyl acrylate monomer,
   wherein the sum of (i) plus (ii) equals 100 parts by weight of the polymerizable acrylic monomer;
   (b) correspondingly, from about 95 parts to about 5 parts by weight of a preformed silicone adhesive, wherein the sum of (a) plus (b) equals 100 parts by weight;
   (c) optionally, up to about 5 parts by weight of a photoinitiator based upon 100 parts by weight of the polymerizable acrylic monomer; and
   (d) optionally, up to about 5 parts by weight of a crosslinker based upon 100 parts by weight of (a) plus (b).

3. A constrained layer vibration damper according to claim 1 wherein the radiation curable material consists essentially of (a) from about 30 parts to about 95 parts by weight polymerizable acrylic monomer, and (b) correspondingly, from about 70 parts to about 5 parts by weight preformed silicone adhesive, wherein the sum of (a) plus (b) equals 100 parts by weight.

4. A constrained layer vibration damper according to claim 2 wherein the modifier monomer is selected such that a homopolymer thereof has a glass transition temperature which is greater than the glass transition temperature of a homopolymer of the alkyl acrylate monomer.

5. A constrained layer vibration damper according to claim 1 wherein the preformed silicone adhesive was dissolved in the polymerizable acrylic monomer prior to polymerization of the radiation curable material.

6. A constrained layer vibration damper according to claim 1 wherein the stiff constraining layer is metal.

7. A constrained layer vibration damper according to claim 1 wherein the vibration damping material is a pressure sensitive adhesive.

8. A constrained layer vibration damper according to claim 1 further comprising a release liner releasably attached to the pressure sensitive adhesive vibration damping material.

9. An article comprising a substrate subject to resonant vibrations and a constrained layer vibration damper according to claim 1 attached to the substrate for damping the resonant vibrations.

10. A constrained layer vibration damper according to claim 2 wherein the photoinitiator comprises from about 0.01 to about 2 parts by weight of the radiation curable material.

11. A constrained layer vibration damper according to claim 10 wherein the crosslinker comprises from about 0.01 to about 5 parts by weight based upon 100 parts by weight of (a) plus (b).

12. A constrained layer vibration damper according to claim 1 wherein the radiation curable material was polymerized by ultraviolet radiation.

13. A constrained layer vibration damper according to claim 1 wherein the radiation curable material further includes a photoinitiator.

14. A constrained layer vibration damper according to claim 13 wherein the photoinitiator provides about 0.01 to about 5 parts by weight based upon 100 parts by weight of the polymerizable acrylic monomer.

\* \* \* \* \*